(12) United States Patent
Rudy et al.

(10) Patent No.: US 10,881,245 B2
(45) Date of Patent: Jan. 5, 2021

(54) MODULAR GRIDDLE WITH SEARING DEVICE

(71) Applicant: AccuTemp Products, Inc., Fort Wayne, IN (US)

(72) Inventors: Raymond R. Rudy, Huntington, IN (US); Gary L. Seitz, Decatur, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 161 days.

(21) Appl. No.: 15/981,360

(22) Filed: May 16, 2018

(65) Prior Publication Data

US 2018/0255970 A1    Sep. 13, 2018

Related U.S. Application Data

(60) Provisional application No. 62/508,345, filed on May 18, 2017, provisional application No. 62/647,958, filed on Mar. 26, 2018.

(51) Int. Cl.
*A47J 37/06* (2006.01)
*A47J 27/14* (2006.01)
*A47J 37/07* (2006.01)

(52) U.S. Cl.
CPC ............. *A47J 37/067* (2013.01); *A47J 27/14* (2013.01); *A47J 37/0704* (2013.01); *A47J 37/0786* (2013.01)

(58) Field of Classification Search
CPC .. A47J 37/0611; A47J 37/0617; A47J 37/067; A47J 37/0676; A47J 37/0682
See application file for complete search history.

(56) References Cited

U.S. PATENT DOCUMENTS

| 3,377,942 | A | 4/1968 | Carbon |
| 4,498,695 | A | 2/1985 | Pardo |
| 4,697,504 | A | 10/1987 | Keating |
| 4,987,827 | A | 1/1991 | Marquez |
| 5,839,359 | A | 11/1998 | Gardner |
| 5,934,182 | A | 8/1999 | Harter et al. |
| 6,263,786 | B1 | 7/2001 | Raio et al. |

(Continued)

OTHER PUBLICATIONS

Star Manufacturing International Inc. product guide for Grill Express Sandwich Grills, Aug. 2017. 2 pages.

(Continued)

*Primary Examiner* — Jason L Vaughan
(74) *Attorney, Agent, or Firm* — Faegre Drinker Biddle & Reath LLP

(57) ABSTRACT

A collection of cooking devices are modularly attachable to a common base frame. For example, a searing device can be selectively attached to a pivotable handle assembly, such that the handle and searing device are moveable between a sear position and a raised position relative to the griddle. The searing mechanism of the present disclosure is sized to provide a sear surface capable of searing multiple items of food simultaneously. The searing device may be removed from the base frame without tools, and other griddle attachments may be installed in its place to modularly alter the function of the griddle. The pivotable attachment point may provide a forward-bias balance such that the griddle provides even pressure on food items even as griddle attachment is raised and lowered, while also avoiding a sudden release of steam and/or heat in the direction of the operator upon raising the handle.

18 Claims, 18 Drawing Sheets

(56) References Cited

U.S. PATENT DOCUMENTS

| | | |
|---|---|---|
| 6,467,400 B2 | 10/2002 | Raio et al. |
| 7,878,109 B2 | 2/2011 | Calzada et al. |
| 8,763,519 B2 | 7/2014 | Ricchio et al. |
| 9,861,230 B2 | 1/2018 | Freymiller et al. |
| 10,143,335 B2 | 12/2018 | Volatier et al. |
| 10,154,761 B2 | 12/2018 | Seitz |
| 10,271,685 B2 | 4/2019 | Gulkanat et al. |
| 10,478,004 B2 | 11/2019 | Tresser et al. |
| 10,518,574 B2 | 12/2019 | Robinson et al. |
| 2010/0186601 A1 | 7/2010 | Gulkanat |
| 2014/0033931 A1 | 2/2014 | Chen Hui |
| 2014/0123861 A1 | 5/2014 | Cooper et al. |
| 2016/0029838 A1 | 2/2016 | Freymiller et al. |
| 2016/0029845 A1 | 2/2016 | Seitz |
| 2016/0227963 A1 | 8/2016 | Gulkanat et al. |
| 2016/0250816 A1 | 9/2016 | Robinson et al. |
| 2016/0309941 A1 | 10/2016 | Minard |
| 2017/0265672 A1 | 9/2017 | Tresser et al. |
| 2017/0325632 A1 | 11/2017 | Volatier et al. |
| 2018/0125297 A1 | 5/2018 | Walker et al. |

OTHER PUBLICATIONS

American Griddle product guide for 3ft Steam Griddle, May 2017. 1 page.

Keating of Chicago, Inc. product guide for Top-Side Cooker, Apr. 2017. 2 pages.

Vulcan product guide for VMCS Heavy Duty Electric Griddle Top, Nov. 2017. 2 pages.

Taylor United Technologies product guide for L812 Electric Two-Sided Grill, Jun. 2018. 2 pages.

CutleryandMore.com, "Cuisinart Nonstick Frittata Set", Oct. 16, 2014, p. 1 (Year: 2014).

Non-Final Office action received for U.S. Appl. No. 16/047,918, date Aug. 14, 2020, 71 pages.

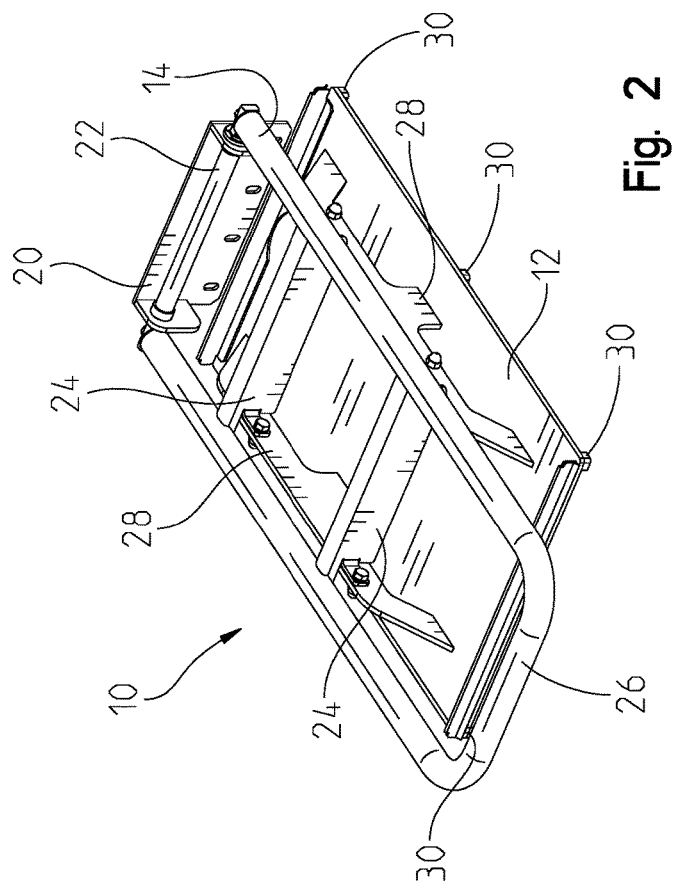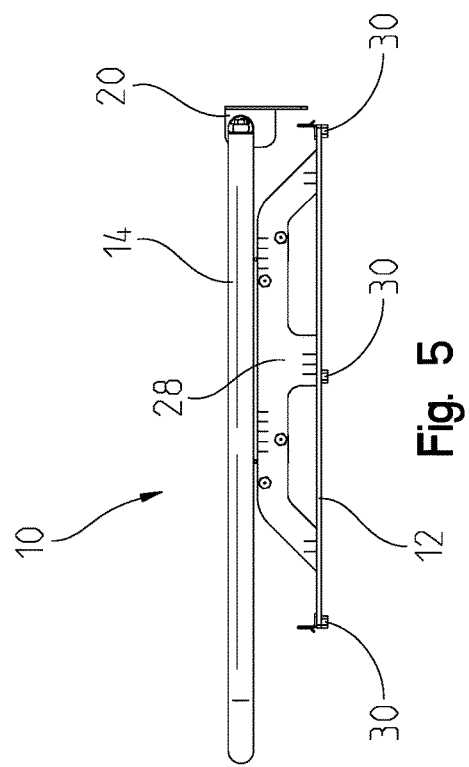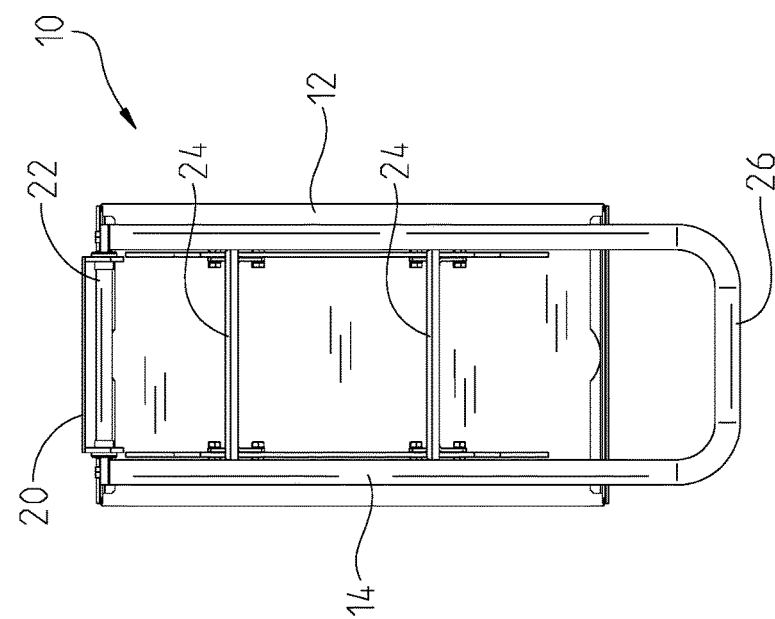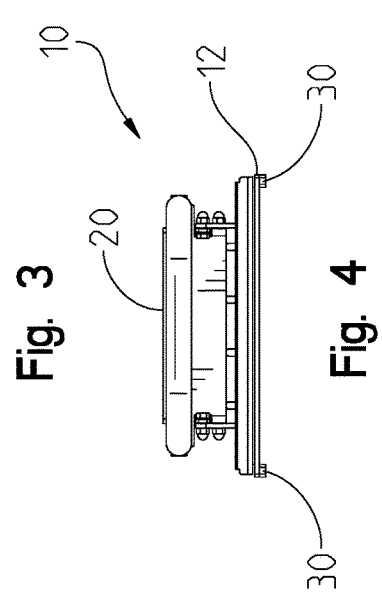

MODULAR GRIDDLE WITH SEARING DEVICE

CROSS REFERENCE TO RELATED APPLICATIONS

This application claims the benefit under Title 35, U.S.C. § 119(e) of U.S. Provisional Patent Application Ser. No. 62/508,345, entitled SEARING DEVICE FOR GRIDDLE COOKED FOOD and filed on May 18, 2017, and U.S. Provisional Patent Application Ser. No. 62/647,958, entitled MODULAR GRIDDLE WITH SEARING DEVICE and filed on Mar. 26, 2018, the entire disclosures of which are hereby expressly incorporated by reference herein.

BACKGROUND

1. Technical Field

The present disclosure is directed to a modular griddle and, in particular, to a griddle with selectively attachable searing, steaming or other cooking devices moveable relative to a griddle cooking device and sized to simultaneously process multiple food items placed on the cooking surface of the griddle cooking device.

2. Description of the Related Art

Cooking appliances designed for high throughput of foods prepared on a griddle are common in the restaurant industry. In many circumstances, the food items to be cooked on the griddle benefit from being seared, i.e., being compressed against the griddle cooking surface to eliminate voids in the food item abutting the cooking surface to create a uniform caramelized sear. For example, burgers of many types (e.g., ground or chopped beef, turkey, bison, etc.) benefit from being seared against the grilling surface to create a caramelized outer layer and seal in natural meat juices, thereby enhancing the flavor of the cooked burger. Additional food items, such as bacon, achieve more consistent and faster cooking when pressed.

In certain circumstances, a weighted searing implement having a contact surface just larger than an individual patty to be cooked is utilized to press food against the griddle surface and sear the same. Unfortunately, searing multiple food items with such a device cannot be done simultaneously, with the device requiring application to each individual food item. Furthermore, because such a searing device is not integral with the griddle, a convenient storage location must be provided.

Other griddle functions include steaming food items, cooking food items between two heated platens, and toasting food items (e.g., buns) on the heated griddle. These and other griddle functions may also utilize specialized griddle equipment.

SUMMARY

The present disclosure provides a collection of cooking devices which are modularly attachable to a common base frame. For example, a searing device can be selectively attached to a pivotable handle assembly, such that the handle and searing device are moveable between a sear position and a raised position relative to the griddle. The searing mechanism of the present disclosure is sized to provide a sear surface capable of searing multiple items of food simultaneously. The searing device may be removed from the base frame without tools, and other griddle attachments may be installed in its place to modularly alter the function of the griddle. The pivotable attachment point may provide a forward-bias balance such that the griddle provides even pressure on food items even as griddle attachment is raised and lowered, while also avoiding a sudden release of steam and/or heat in the direction of the operator upon raising the handle.

In one form thereof, the present disclosure provides a base frame for a modular cooking mechanism, comprising: a frame having a proximal portion with a handle configured for operator manipulation, and a distal portion opposite the proximal portion; a yoke assembly comprising: a yoke frame having a base plate and a pair of arms extending away from the base plate, the pair of arms each having an aperture formed therethrough which defines an axis substantially parallel to a plane defined by the base plate; a pivot shaft fixed to the distal portion of the frame and coupled to the apertures formed in the pair of arms, such that the pivot shaft defines a pivot axis of the frame; a counterbalance spring coiled around the pivot shaft and having a first end attached to the yoke frame, and a second end attached to the pivot shaft, whereby rotation of the frame about the pivot axis is biased by the counterbalance spring; and a modular attachment feature fixed to the frame between the proximal portion and the distal portion, the modular attachment feature comprising a cylindrical mounting surface defining an attachment pivot axis substantially parallel to the pivot axis of the frame.

In another form thereof, the present disclosure provides a griddle comprising: a cooking surface; a base frame rotatable between a closed position and an open position, the base frame having a first attachment feature; a first cooking attachment having a second attachment feature complementary to the first attachment feature, such that the first attachment feature is engageable with the second attachment feature to removably attach the first cooking attachment to the base frame; and a second cooking attachment having a third attachment feature complementary to the first attachment feature, such that the first attachment feature is engageable with the third attachment feature to removably attach the second cooking attachment to the base frame, whereby the first and second cooking attachments are modularly attachable to the griddle via the base frame.

In yet another form thereof, the present disclosure provides a method of modularly mounting a plurality of cooking attachments to a pivotable base frame of a griddle, the method comprising: aligning a slot formed on one of the cooking attachment and the pivotable base frame with a correspondingly sized cylindrical mounting surface formed on the other of the cooking attachment and the pivotable base frame; and seating the cylindrical mounting surface within the slot, by hand and without the use of tools.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 2 is a perspective view of the searing mechanism of the present disclosure;

FIG. 3 is a plan view thereof;

FIG. 4 is a front elevational view thereof;

FIG. 5 is a side elevational view thereof;

Figure 1:
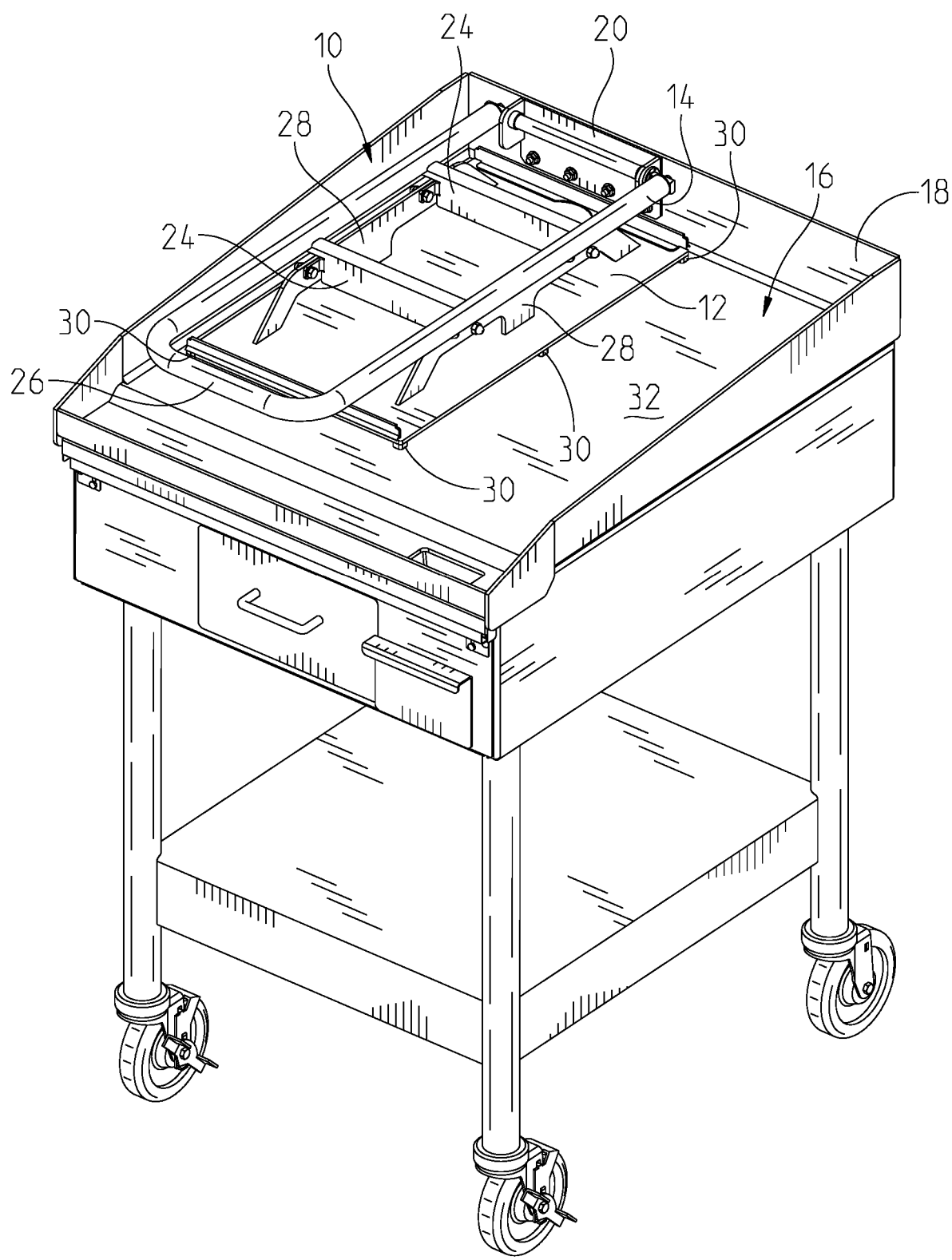
FIG. 1 is a perspective view of a griddle incorporating the searing mechanism of the present disclosure, with the searing mechanism shown in sear position.
Figure 6:
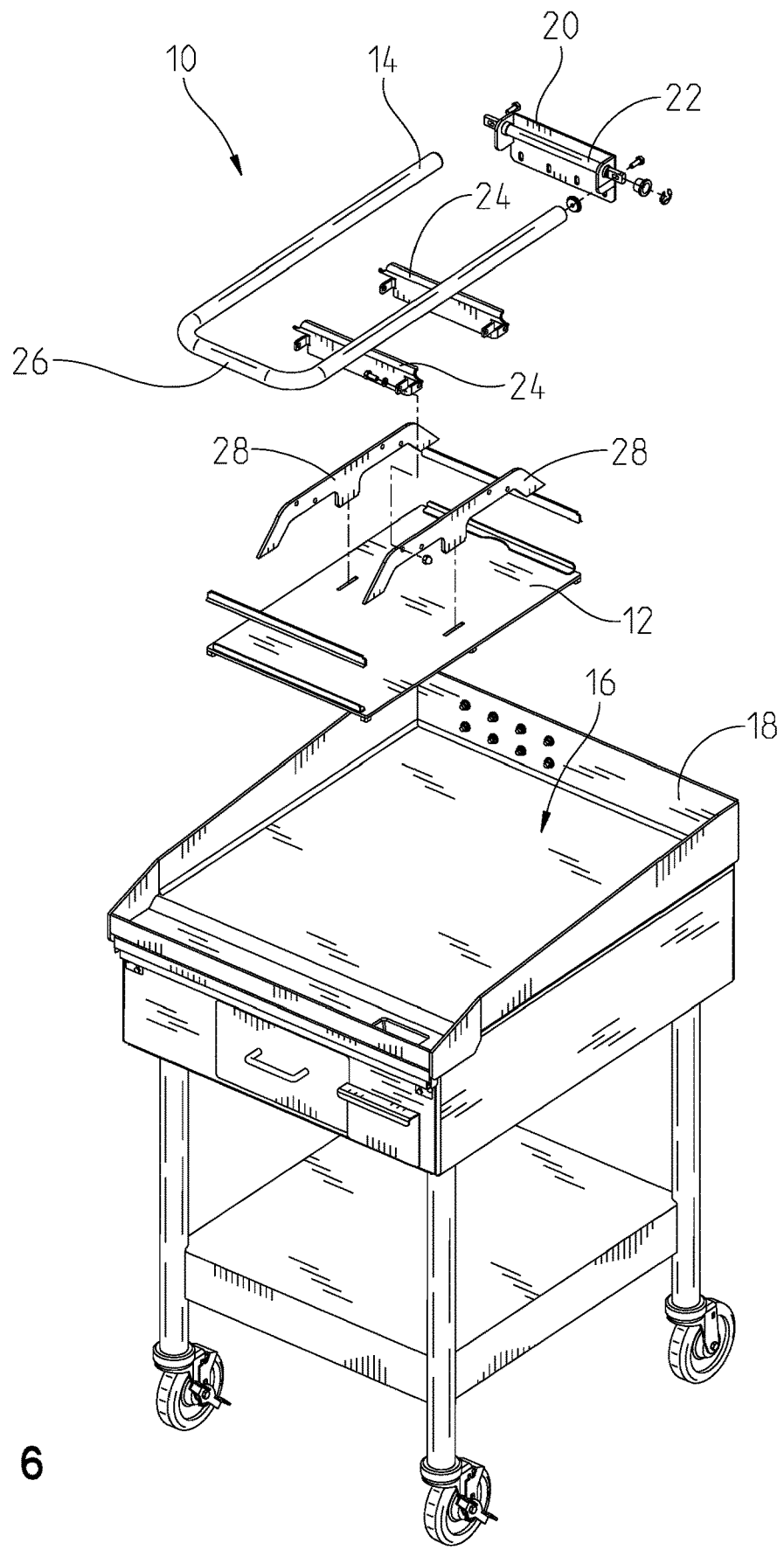
FIG. 6 is a perspective, exploded view of the griddle/searing mechanism of FIG. 1.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

Figure 9:
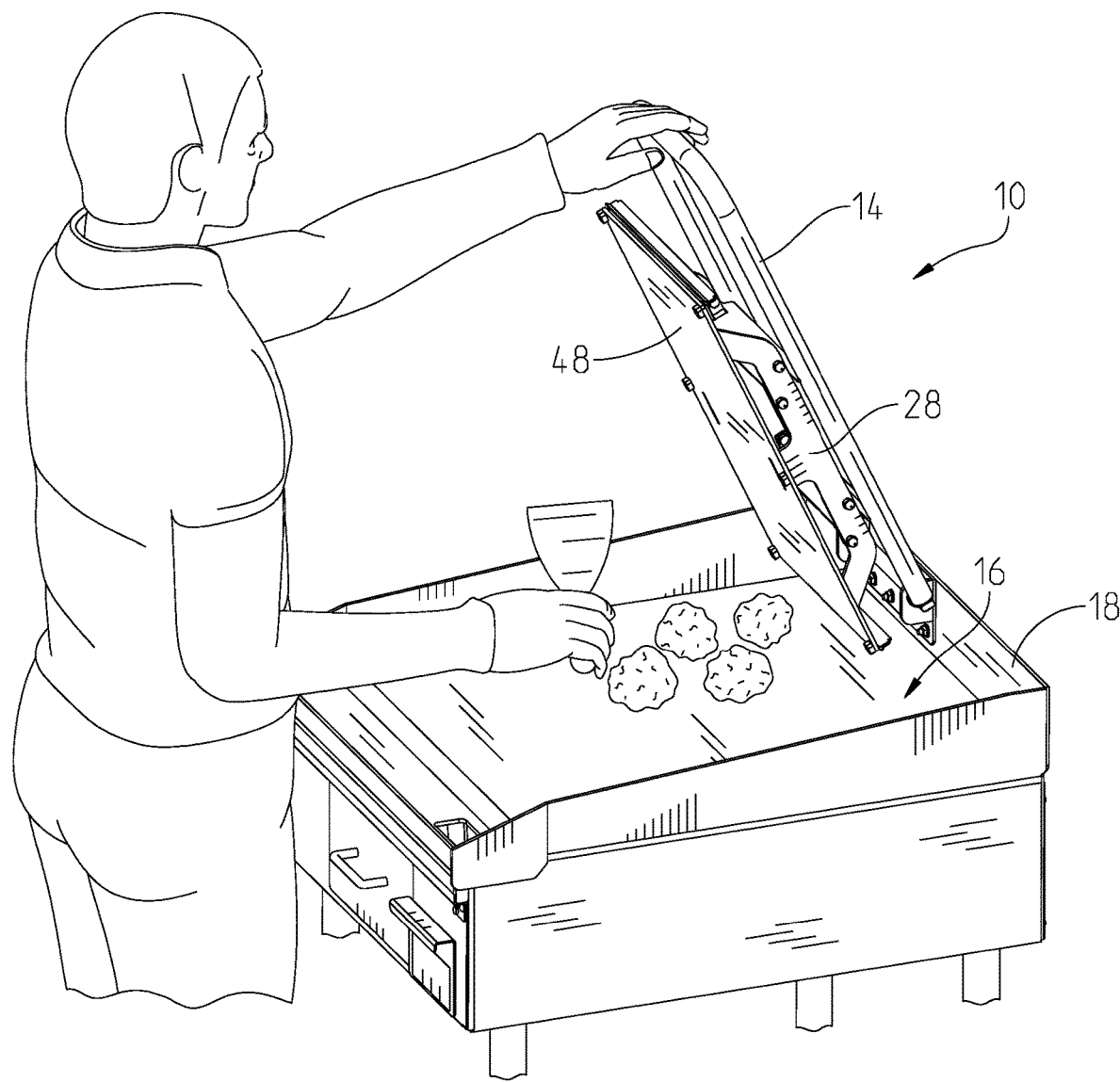
FIG. 9 is another perspective view of a griddle incorporating a searing mechanism of the present disclosure.

Referring to FIGS. 1 and 9, searing mechanism 10 of the present disclosure is fixed to griddle 16 to become an integral feature thereof. Specifically, yoke 20 of searing mechanism 10 is bolted to splash shield 18 to secure searing mechanism 10 to griddle 16. Searing mechanism 10 includes searing plate 12 presenting searing surface 34 (FIG. 7) facing cooking surface 32 of griddle 16. Searing surface 34 presents a surface area of about 288 square inches (e.g., 12 inches by 24 inches) capable of searing multiple food items. For example, searing mechanism 10 may be used to simultaneously sear up to 12 quarter pound burger patties placed on cooking surface 32 of griddle 16.

In use, searing mechanism 10 can be rotated between the raised position illustrated in FIG. 9 to the sear position illustrated in FIG. 1. In the raised position, the portion of cooking surface 32 of griddle 16 can be accessed to place food items in the field of use of searing mechanism 10 or to manipulate food already placed in the field of use, e.g., to flip the food items. For the purposes of this document, the "field of use" of the searing mechanism is the area of the cooking surface 32 of the underlying griddle 16 that is covered by the searing plate 12 of searing mechanism 10 in the sear position illustrated in FIG. 1, whether or not searing mechanism 10 maintains the sear position, i.e., the "field of use" remains the same when the searing mechanism is raised to the raised position illustrated in FIG. 9.

Figure 7:
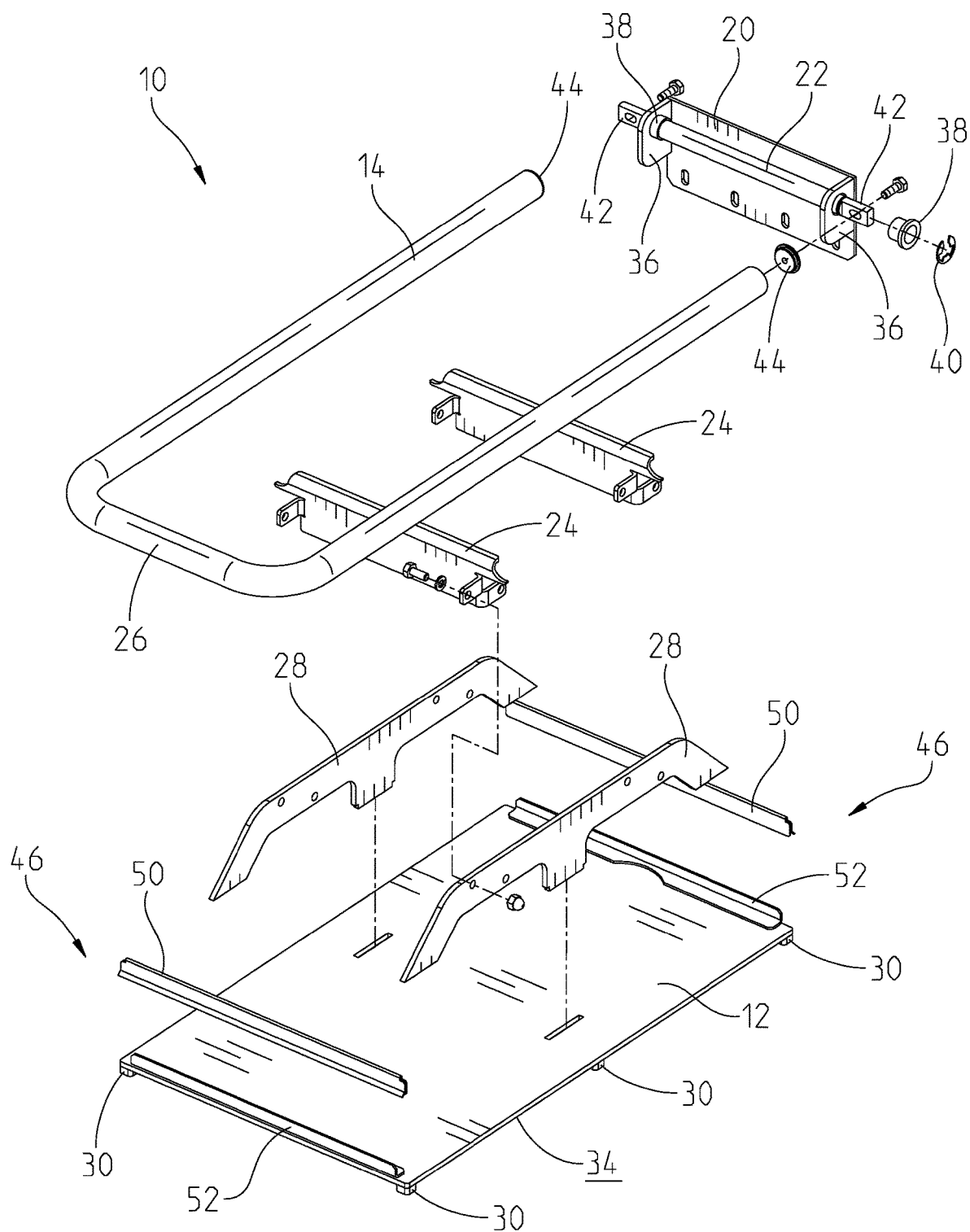
FIG. 7 is a partially exploded view of the searing mechanism of FIG. 2.

Referring to FIG. 7, yoke 20 presents a pair of arms 36, each having an aperture through which shaft 22 can be positioned to rotatably support searing plate 12 relative to griddle 16. Bushings 38 are interposed between the outer diameter of shaft 22 and the walls of arms 36 forming the apertures therethrough. A pair of snap rings 40 (only one of which is illustrated in FIG. 7) are respectively secured in annular grooves at the opposing ends of shaft 22 to secure the axial positions of bushings along the length of shaft 22. With snap rings 40 secured to shaft 22, the radially outward flanges of each bushing 38 substantially fills the axial space between the respective snap ring 40 and arm 36. In this context, "substantially fill" means that the radial flanges of bushings 38 cannot move axially a distance that would allow either of bushings 38 to move out of the aperture in arm 36 in which they are positioned, but still the radial flanges of the bushings 38 are sufficiently spaced from the corresponding arms 36 and snap rings 40 to allow for the rotation described in detail below.

With bushings 38 and snap rings 40 secured relative to yoke 20, as described above, extensions 42 from shaft 22 extend from either side of yoke 20. As illustrated in FIG. 7, each extension 42 presents a flat nominally defining a plane parallel to the longitudinal axis of shaft 22 and an aperture defining a longitudinal axis nominally orthogonal to the flat. U-shaped frame 14 is constructed of tubular stainless steel and presents open ends adjacent to yoke 20. The open ends of U-shaped frame 14 have plugs 44 secured therein, e.g., via welding. Each plug 44 includes a central, threaded aperture. A pair of bolts (only one of which is shown in FIG. 7) respectively traverse the apertures in extensions 42 and are threaded into plugs 44 to secure U-shaped frame 14 to shaft 22. The flats at each extension 42 are thereby pressed against flat end surfaces of plugs 44 to key U-shaped frame 14 relative to shaft 22. The remaining structure of searing mechanism 10 depends from, e.g., is suspended by, U-shaped frame 14 such that the above-described securement of U-shaped frame 14 to shaft 22 rotatably connects searing plate 12 to griddle 16.

Spanning the arms of U-shaped frames are cross frames 24. As illustrated in FIG. 7, each opposing end of cross frames 24 presents a rounded void, into which each arm of U-shaped frame is positioned and subsequently welded thereto. Each cross frame 24 is bolted to an upright 28 at each end thereof. Each upright 28 includes a central riser with a laterally recessed downward extension fit into a correspondingly sized slot in searing plate 12, such that each upright 28 is configured to evenly distribute a downward force on handle 26 throughout the area of searing plate 12. With the central risers of uprights 28 positioned in the respective slots in searing plate 12, uprights 28 are secured to searing plate 12, e.g., via welds. In this way, searing plate 12 is rotatably connected to yoke 20 and thereby to griddle 16.

Figure 8:
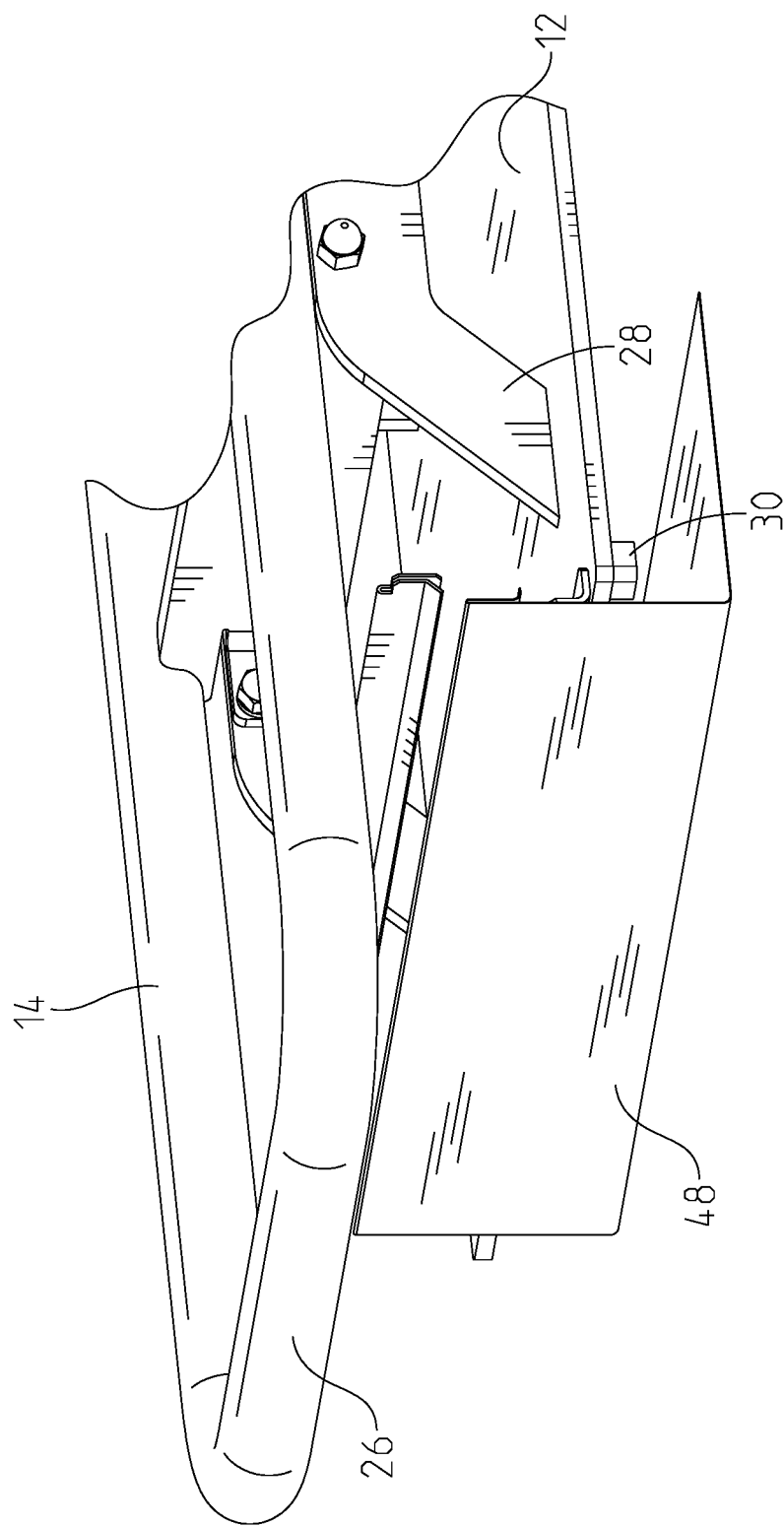
FIG. 8 is a partial perspective view of the searing mechanism of FIG. 2.

Welded to the front and back of searing plate 12 are securement features 46. Each securement feature 46 includes an upright 52 extending upward from the top of searing plate 12 opposite searing surface 34. Uprights 52 may be welded to searing plate 12. A sheet 48, made of or coated with polytetrafluoroethylene (PTFE) such as TEFLON® available from DuPont (FIGS. 8 and 9) is positioned over top of searing surface to provide a non-stick surface for contacting food. Sheet 48 includes opposing front and back ends that are draped over uprights 52. Connectors 50 comprise U-shaped spring steel components having a groove formed between the upstanding arms of the "U" formed thereby. After draping sheet 48 over uprights 52, connectors 50 are positioned over sheet 48 and in frictional engagement with upright 52 (and the sheet positioned overtop) to hold sheet 48 in place over top of searing surface 34.

Feet 30 extend downwardly from searing surface 34 and are positioned about the perimeter of searing plate 12. In the exemplary embodiment illustrated, six feet 30 are spaced about the perimeter of searing plate 12. Sheet 48 includes cutouts accommodating feet 30. Feet 30 extend a distance from searing surface 34 equal to the desired thickness of the food item to be seared.

After placing food items in the field of use of searing mechanism 10, searing mechanism 10 can be moved from the open position illustrated in FIG. 9 to the closed or cooking position illustrated in FIG. 1. Handle 26, which is the base of U-shaped frame 14, can be manipulated by hand to effect such movement. Advantageously, the force to compress the food items can be applied by the operator through handle 26 at the front of the griddle, as opposed to prior searing devices, which required application of force to individual food items and, therefore, necessitated leaning over the griddle to access all of the food items. In this way, the present invention is provides a searing mechanism with improved ergonomics relative to the prior art, which reduces the risk of wrist injury from smashing hundreds of food items such as hamburgers individually each hour at a high throughput restaurant. The user can grasp handle 26 in the raised position of searing mechanism 10 (FIG. 9) and apply a downward force to rotate searing plate 12 about the longitudinal axis of shaft 22, which acts as a hinge pin for searing mechanism 10. As sheet 48 makes contact with the food items placed in the field of use, compressive force can be applied to the food items by pressing downwardly on handle 26. This downward force is transmitted as a pressure across the area of searing surface 34. Frame 14, 24 and uprights 28 are designed to facilitate even force distribution from handle 26 to searing surface 34.

As searing mechanism 10 approaches the position illustrated in FIG. 1, feet 30 contact cooking surface 32 of griddle 16. Shaft 22 is positioned relative to yoke 20, and; therefore, griddle 16 such that all six feet 30 will achieve flush contact with cooking surface 32 of griddle 16 when searing mechanism 10 is positioned as illustrated in FIG. 1, in the searing position. In this position, additional downward compression of the food items placed on cooking surface 32 of griddle 16 cannot be effected by searing mechanism 10. Feet 30 create a uniform spacing, thereby producing consistent food thickness, which improves quality and consistency of food items cooked or otherwise processed using mechanism 10. Additionally, the device of the present disclosure advantageously decreases cook times by holding expelled juices under searing plate 12. Juices under searing plate 12 are vaporized into steam to decrease the cook time.

In additional embodiments of the present disclosure, adjustable feet 30 are utilized in conjunction with a floating or adjustable hinge (in lieu of fixed yoke 20 and shaft 22) so that different food thickness can be accommodated. Specifically, feet 30 may be extended or retracted to establish an alternative food thickness with a complementary adjustment made to the hinge structure. Consistent thickness also increases food safety, as cooking times can be precisely controlled to achieve a desired food temperature.

In further alternative embodiment of the present disclosure, an over-center or cam mechanism may be utilized to automatically press searing mechanism 10 into the sear position illustrated in FIG. 1 and/or to facilitate moving the searing mechanism to the raised position illustrated in FIG. 9.

Additionally, a torsion spring and/or compression spring may be utilized to hold searing mechanism 10 in the raised position, after overcoming, e.g., an over-center or cam mechanism holding searing mechanism 10 in the sear position. One exemplary embodiment of a spring-biased arrangement is discussed below with respect to modular cooking mechanism 100.

In further yet alternative embodiments, a multiple zone griddle with a plurality of searing mechanisms can be provided, such as the three-zone griddle 116 shown in FIG. 10 and described in further detail below.

For example, an alternatively arranged searing device and its components is shown in FIGS. 10-22C as searing attachment 110 and described in further detail below. Searing attachment 110 is substantially similar to searing mechanism 10 described above, with reference numerals of attachment 110 analogous to the reference numerals used in mechanism 10, except with 100 added thereto. Elements of attachment 110 correspond to similar elements denoted by corresponding reference numerals of mechanism 10, except as otherwise noted.

Moreover, FIGS. 10-22C illustrate a modular arrangement in which searing device may be used interchangeably with various other cooking attachments, by operation of a modular attachment feature on each base frame 102 which can be engaged with a corresponding attachment feature on each attachment for tool-less installation and removal.

Figure 10:
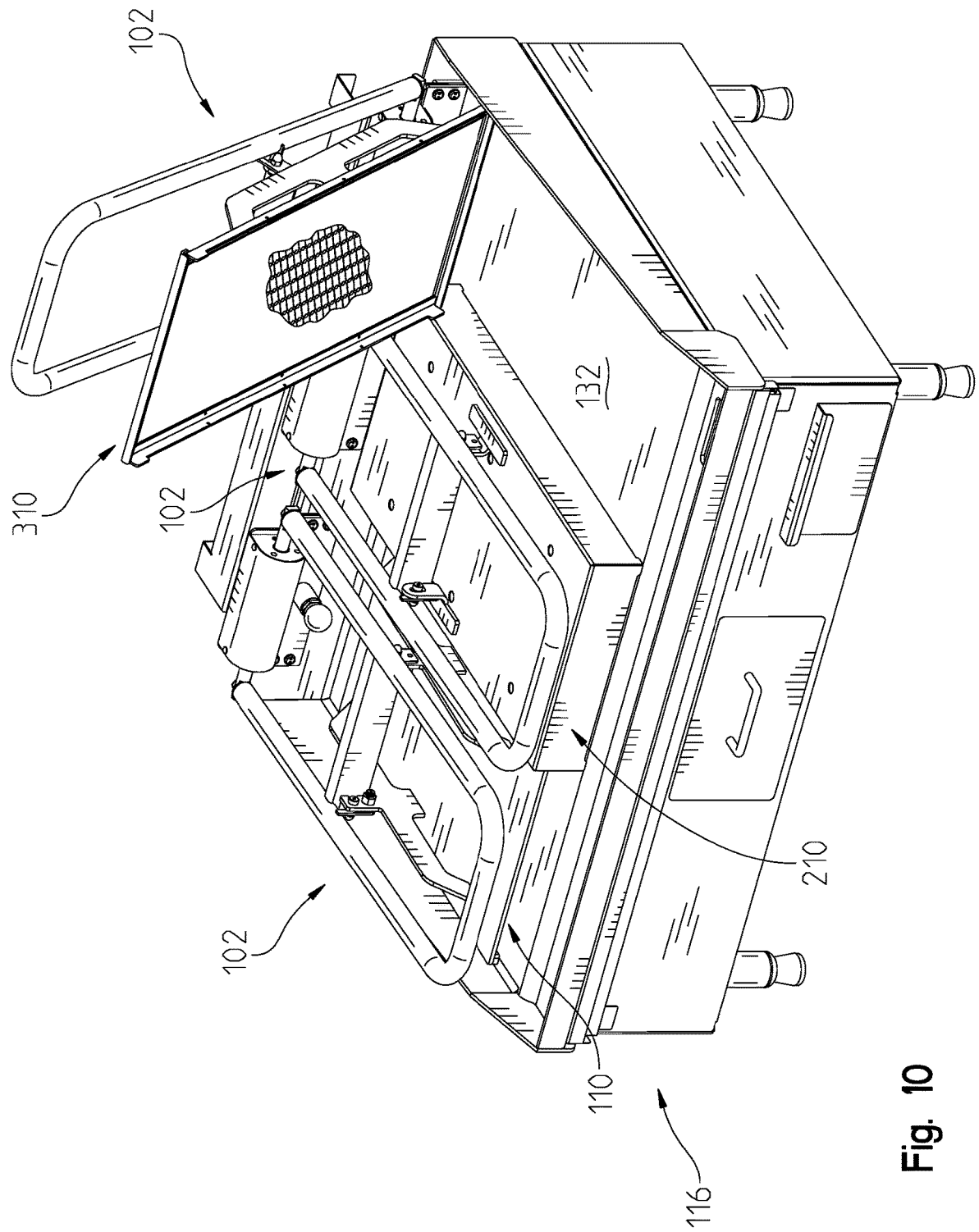
FIG. 10 is a perspective view of a griddle with modular cooking mechanisms of the present disclosure attached thereto.

Turning now to FIG. 10, griddle 116 is shown with three cooking stations, each served by an individual base frame 102. Three different cooking attachments 110, 210, 310 are removably attached to respective frames 102. As described in further detail below, each cooking attachment 110, 210, 310 may serve individual cooking functions in conjunction with cooking surface 132 of griddle 116, such as searing attachment 110 for use in cooking seared food products as described above, steaming attachment 210 for the encapsulation of steam for cooking food products, and toasting attachment 310 for toasting buns or other bread products. Moreover, as shown in FIG. 11, these and other attachments may be provided as a kit in the form of modular cooking mechanism 100, which may include one or more base frames 102 and one or more attachments depending on the cooking needs of the griddle operator.

Figure 11:
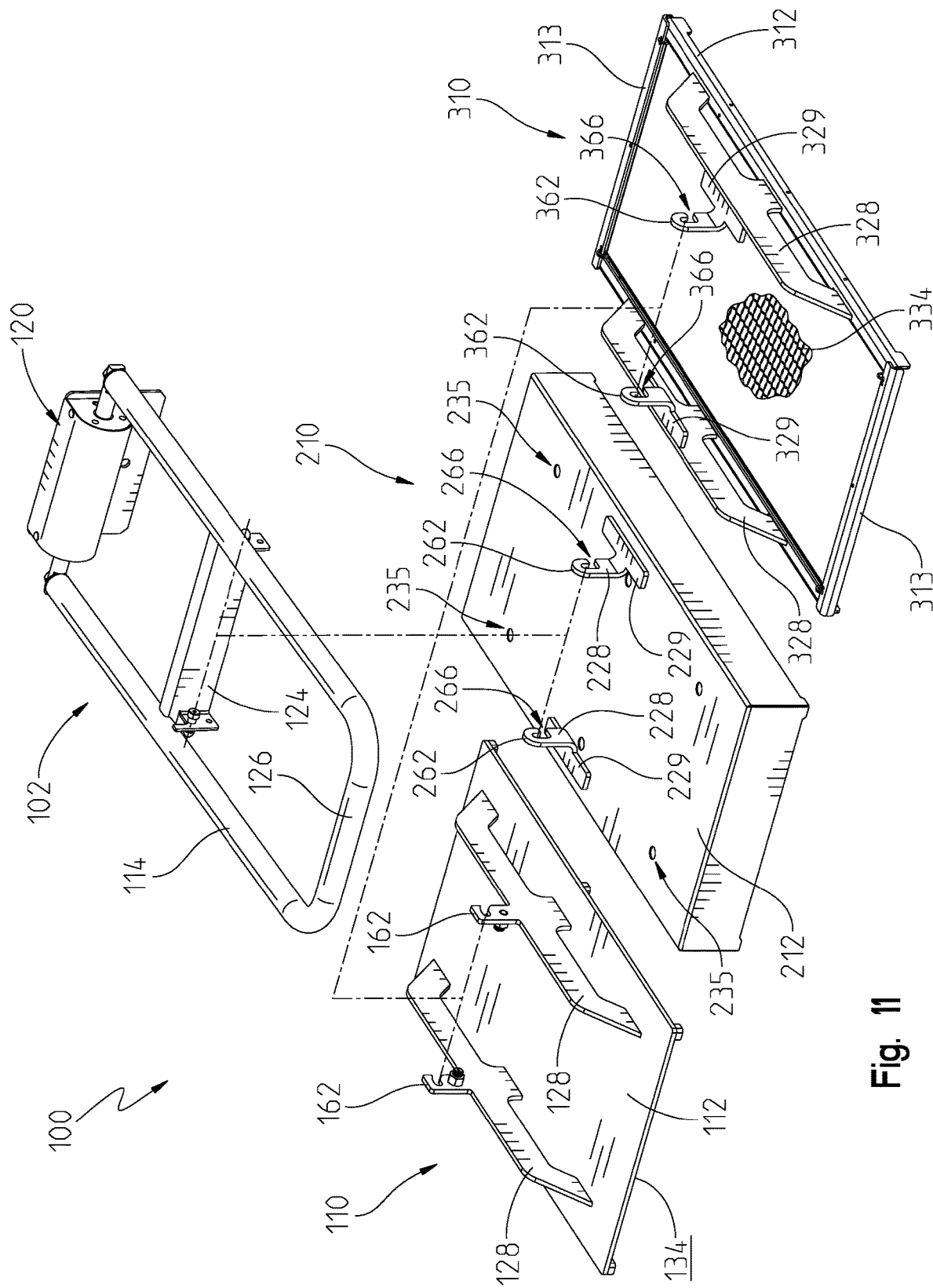
FIG. 11 is a perspective view of a modular cooking mechanism of the present disclosure with various cooking attachments.

Base frame 102, shown in FIG. 11, provides a modular platform for the attachment of any of a variety of cooking attachments via a quick release mechanism 160, shown in FIG. 12 and described in further detail below. Base frame 102 includes U-shaped frame 114 having handle 126 at a proximal portion thereof, similar to frame 14 described above. At a distal portion of frame 114, yoke assembly 120 provides a pivotable attachment between base frame 102 and griddle 116, also described further below. Handle 126 is configured and positioned for manipulation by an operator of griddle 116, who generally stands at the front of griddle 116 opposite the pivotable attachment at yoke assembly 120. Cross frame 124 is fixed to U-shaped frame 114 at a mid position between the proximal handle 126 and the distal yoke assembly 120, approximately equidistant from each.

Figure 12:
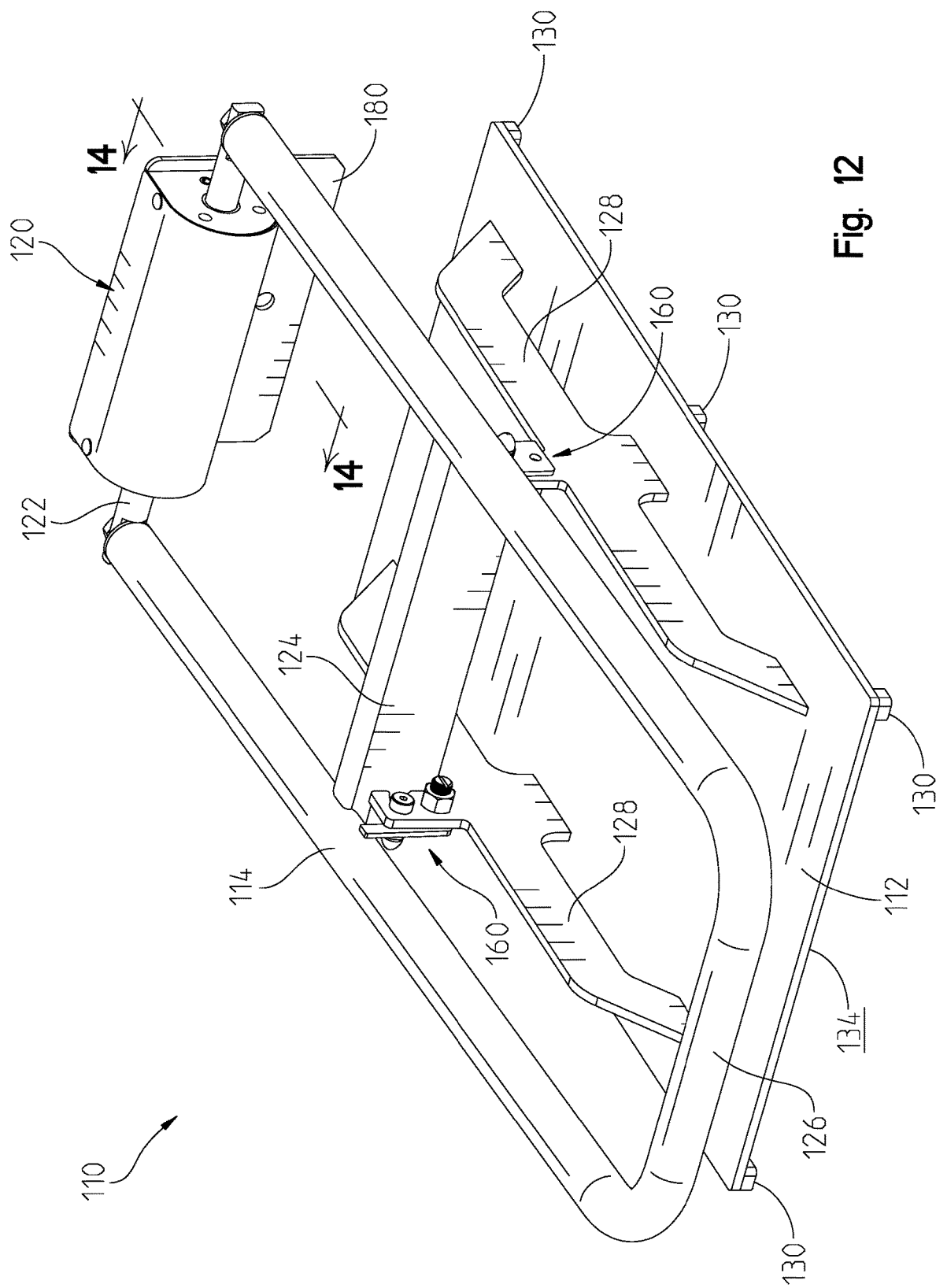
FIG. 12 is a perspective view of a searing attachment of the present disclosure.
Figure 13:
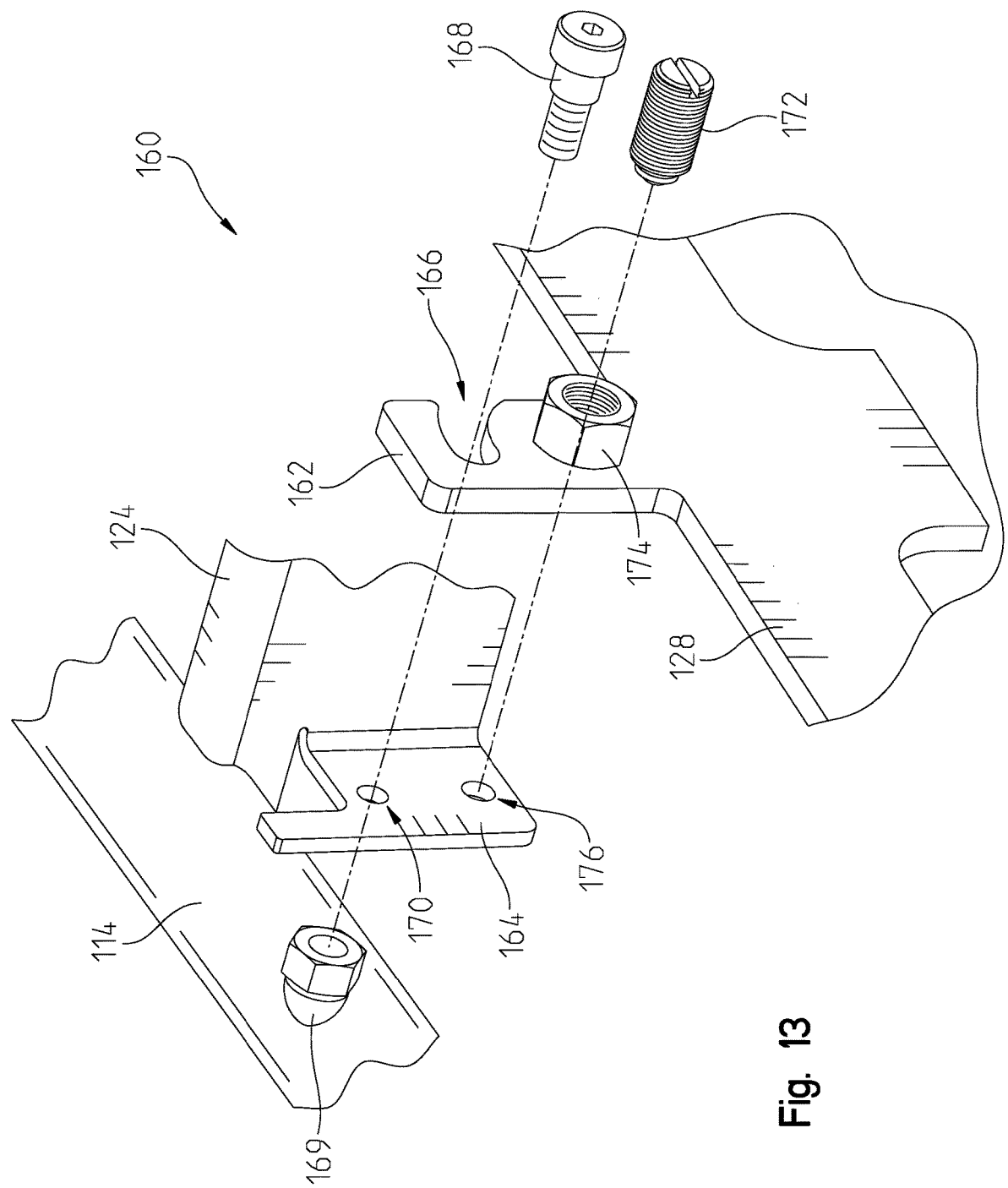
FIG. 13 is an enlarged, perspective view of a portion of the searing attachment of FIG. 12, illustrating a quick-release mechanism of the present disclosure.

As best shown in FIG. 13, cross frame 124 includes a mounting flange 164 extending substantially perpendicularly to the longitudinal extent of cross frame 124. Flange 164 corporates with a corresponding feature on a selected cooking attachment, such as pivot arm 162 formed on upright frame member 128 of searing attachment 110 (FIG. 12), to form quick-release mechanism 160 in conjunction with one or more bolts or other attachment structures, such as pivot bolt 168 and detent mechanism 172. In the exemplary embodiment of FIG. 13, pivot bolt 168 is received through pivot aperture 170 formed in flange 164 and secured by pivot nut 169. In the illustrated embodiment, pivot bolt 168 is a shoulder bolt having a cylindrical surface between the bolt head and bolt thread, and the pair of pivot bolts 168 at the left and right sides of cross frame are coaxial such that the two shoulders together form a cylindrical mounting surface for attachments 110, 210, 310. Because flange 164 is generally perpendicular to the longitudinal extent of cross frame 124, which in turn is substantially parallel to the pivot axis defined by yoke assembly 120, the longitudinal axis of the cylindrical mounting surface formed on pivot bolts 168 defines a pivot axis for attachments 110, 210, 310 which is substantially parallel to the pivot axis of base frame 102.

In the illustrated embodiment, the head of each pivot bolts 168 forms a shoulder adjacent the cylindrical mounting surface, which restrains lateral movement of a pivot arm (e.g., one of pivot arms 162, 262 or 362) when a respective attachment 110, 210 or 310 is mounted to cross frame 124. This restraint of lateral movement ensures that the respective attachment 110, 210 or 310 is free to rotate while also being prevented from any side to side shifting that might otherwise allow attachment 110, 210 or 310 to disengage from the cylindrical mounting surface of pivot bolts 168. Of course, it is also contemplated that a retention shoulder may be formed in other ways or using other structures. For example, flanges 164 may themselves be considered retention shoulders if pivot arms 162 are spaced sufficiently far apart laterally to ensure that lateral movement of attachment 110 cannot traverse the cylindrical surface of bolt 168 on either side. Similar spacing may also be used to retain pivot arms 262, 362 of attachments 210, 310 respectively on the cylindrical surfaces of bolts 168.

In the case of searing attachment 110 shown in FIGS. 12 and 13, pivot arm 162 includes an arcuate pivot slot 166 which is received over the exposed cylindrical mounting surface of pivot bolt 168. Arcuate slot 166 defines a center of rotation about the longitudinal axis of detent mechanism 172, which is threadably received through pivot arm 162 and locked into position by detent retainer 174. In the illustrated embodiment, detent retainer is a hex nut welded to pivot arm 162. A spring loaded detent ball protrudes from detent mechanism 172 and engages detent aperture 176 formed in flange 164 when searing attachment 110 is mounted to base frame 102, as shown in FIG. 12. When so mounted, searing attachment 110 is free to rotate within a limited range of motion about the longitudinal axis of detent mechanism 172 and guided by the abutting interaction between the cylindrical mounting surface of pivot bolt 168 and arcuate slot 166. In this way, the longitudinal axis of pivot bolts 168 defines the attachment pivot axis insofar as it acts as a guide for the pivoting action, working in conjunction with arcuate slot 166 and detent mechanism 172.

Figure 22A:
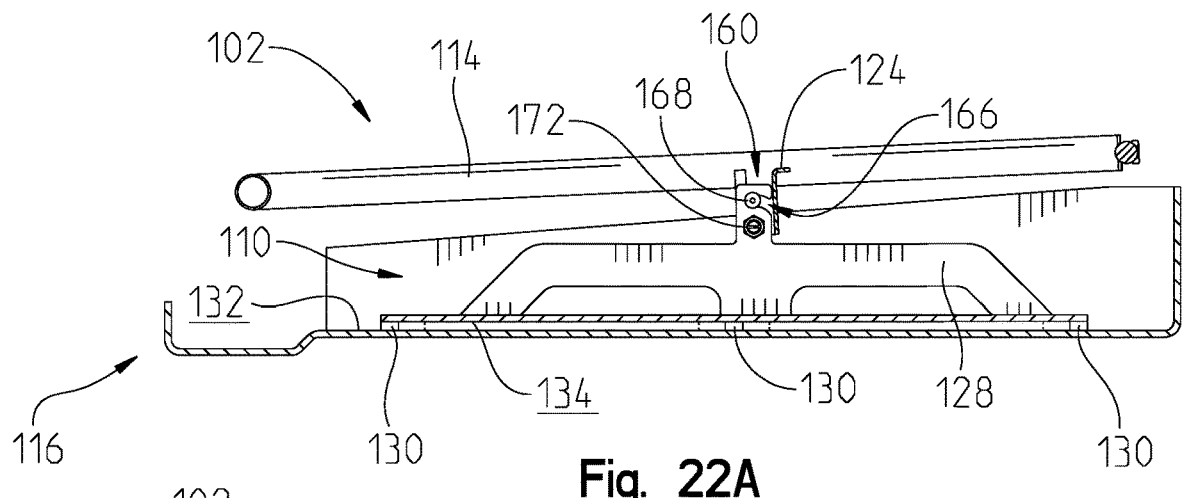
FIGS. 22A-22C are schematic, side elevation views of the searing attachment of FIG. 12 attached to the griddle of FIG. 10, illustrating various stages between closed and open positions of the searing attachment.
Figure 22B:
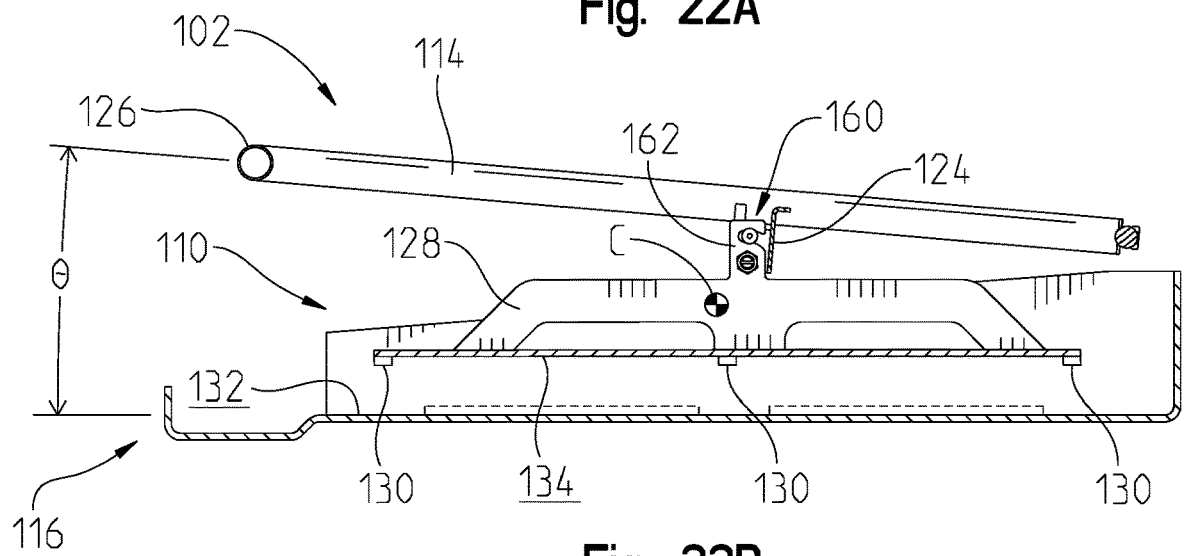
Figure 22C:
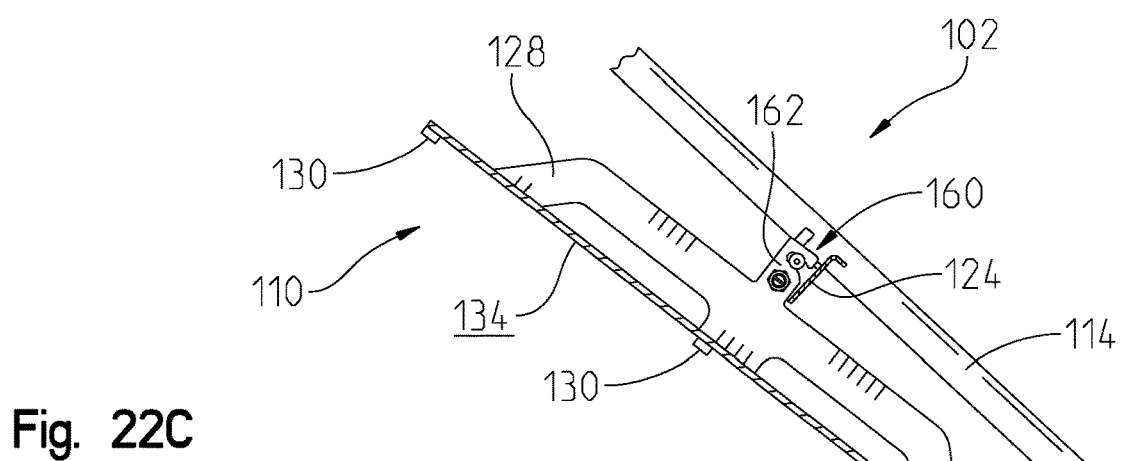

Searing attachment 110 may be installed and removed from base frame 102 by a single operator, by hand and without tools. To do this, searing attachment 110 is first brought into proximity with base frame 102 such that the left and right arcuate slots 166 are aligned with the corresponding left and right pivot bolts 168. The operator then securely seats pivot bolts 168 within their respective slots 166, and then simply releases searing attachment 110. This allows the weight of searing attachment 110 to compress the spring loaded detent ball of mechanism 172 such that it slides over flange 164 and into alignment with a respective aperture 176. When so aligned, the detent ball springs into engagement aperture 176. At this point, searing attachment 110 is in its operable position and free to rotate through its defined range motion pivoting about the longitudinal axis of detent mechanism 172 (including the axis through the springs which bias the detent ball into engagement), as illustrated in FIGS. 22A through 22C and described below. To remove searing attachment 110, the operator can simply apply sufficient force to disengage the detent mechanism 172 from the corresponding apertures 176, and then disengage arcuate slots 166 from pivot bolts 168.

Turning now to FIG. 22A, base frame 102 and griddle attachment 110 are shown in a fully closed position in which an upper cooking surface 134, in this case a searing surface 134, is substantially parallel to the adjacent lower cooking surface 132 of the griddle 116. Corresponding surfaces of steam enclosure 212 and maille 334 (FIG. 11) can also be considered "upper cooking surfaces" within the present disclosure. As noted above with respect to searing mechanism 10, feet 130 may be provided to define a desired spacing between cooking surfaces 132 and 134. In this configuration, quick release mechanism 160 is fully engaged and seated, i.e., pivot bolt 168 is fully seated within arcuate slot 166 and detent mechanism 172 is engaged and operational as a pivot point.

FIG. 22B illustrates base frame 102 having been slightly elevated, such as after an operator-applied upward pressure to handle 126. Center of gravity C of searing mechanism 110 is designed to be slightly forward of quick release mechanism 160, that is, center of gravity C is positioned between handle 126 and the attachment pivot axis defined by mechanism 160. Thus, as handle 126 is lifted and angle θ is formed between cooking surface 132 and the longitudinal axis of the proximal-to-distal portions of U-shaped frame 114, searing surface 134 pivots with respect to base frame 102 to remain substantially parallel to cooking surface 132. In some exemplary embodiments, the forward bias of center of gravity of C may be such that the distal portion of searing surface 134 raises first, such that the proximal portion of searing surface 134 is angled downwardly relative to the distal portion, thereby allowing any trapped steam to vent at the rear of searing attachment 110 and away from the operator standing near the proximal portion of searing surface 134 and to prevent moving food items longitudinally across the cooking surface when lifting or lowering the searing attachment (or any other cooking attachment as described herein).

As the initial lifting procedure depicted in FIG. 22B progresses toward a fully or substantially open configuration, quick release mechanism 160 reaches its maximum forward pivot when pivot arm 162 abuts the adjacent lower edge of cross frame 124, as best shown in FIG. 22C. Thus, the amount of traversal of pivot bolt 168 through arcuate slot 166 is limited to ensure that searing attachment 110 remains securely attached to base frame 102 as they are pivoted away from cooking surface 132 toward the fully open position. In an exemplary embodiment, a "fully open" position is one in which the longitudinal axis of the proximal-to-distal portions of frame 114 are perpendicular or nearly perpendicular to cooking surface 132, such as about 80 degrees. For example the right-most base frame 102 shown in FIG. 10 may be considered fully open.

In one embodiment, steaming attachment 110 may include securement feature 46, TEFLON sheet 48, connectors 50 and upright 52 in order to provide a non-stick searing surface 134 in the same manner as described in detail above with respect to searing mechanism 10. Moreover, as noted herein, the features and components of searing mechanism 10 and searing attachment 110 are interchangeable and may be combined as required or desired for a particular application.

Figure 21:
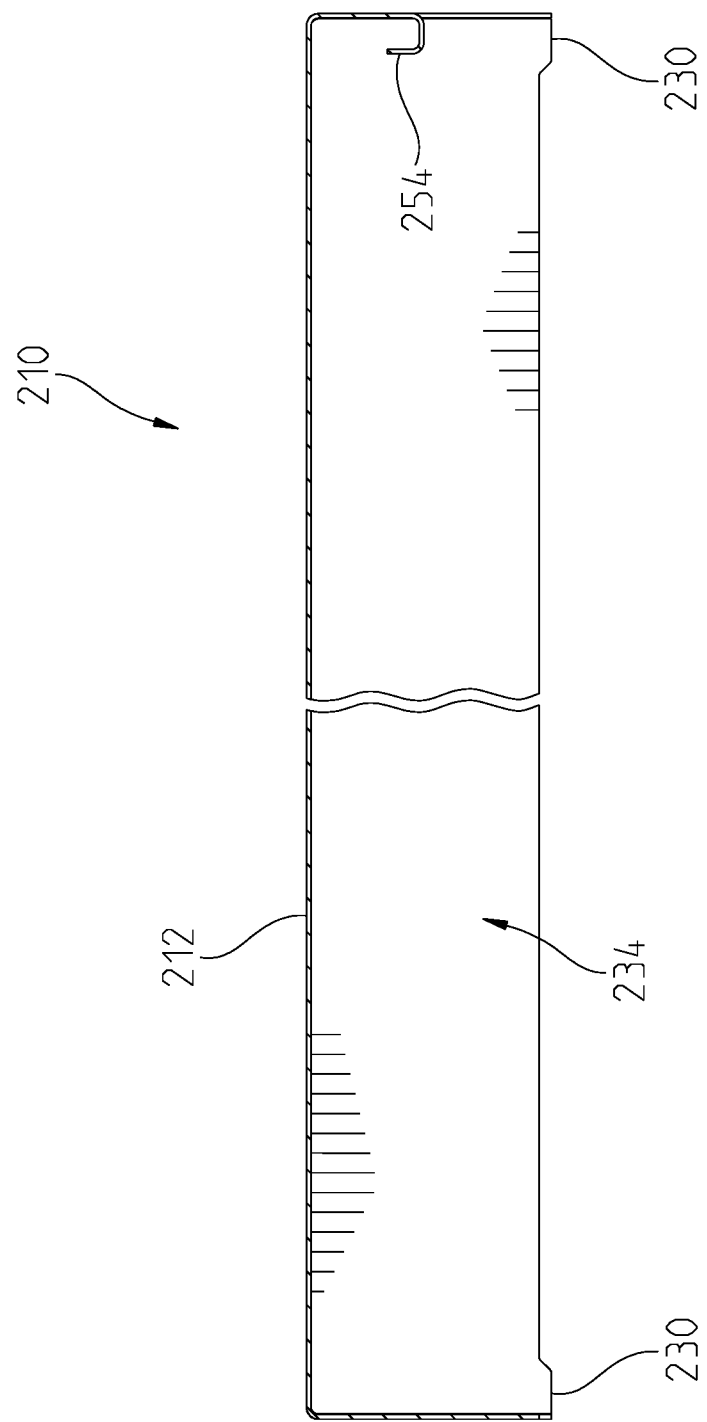
FIG. 21 is a cross-section, elevation view of the steaming attachment of FIG. 20.

As noted above, searing attachment 110 is part of modular cooking mechanism 100, shown in FIG. 11, which may include additional cooking attachments each designed for a particular type of cooking task. In the illustrated embodiment of FIG. 11, such additional attachments may include steaming attachment 210 and toasting attachment 310. Steaming attachment 210 includes steam enclosure 212, formed as a long and wide five-sided box with an open bottom. Steaming attachment includes a pair of flanges 229 fixed (e.g., welded) to the top surface of steam enclosure 212. Steam enclosure 212 may include a number of steam vents 235 formed in the top surface thereof, such as six vents 235 as illustrated, to allow for controlled release of steam during a cooking operation. The four lower corners of enclosure 212 form feet 230, as shown best in FIG. 20, which respectively rest upon cooking surface 132 when base frame 102 and steaming attachment 210 are in the closed position. When in such closed position, steam cavity 234 (FIG. 20) defined by steam enclosure 212 traps steam created by moisture released from food items and/or added to cooking surface 132. This steam cooks the food items contained within cavity 234. To the extent that condensing steam forms droplets on the generally horizontal upper surface of steam enclosure 212 within cavity 234 during a cooking operation, such moisture tends to run distally when steaming assembly 210 is opened. This distally-running moisture is channeled in a drip catch 254, as best shown in FIG. 21 as a U-shaped fluid channel. The moisture in drip catch 254 is laterally diverted to the left and/or right side of cavity 234, thereby avoiding excess moisture in the vicinity of yoke assembly 120.

Steaming attachment 210 has a forward-biased center of gravity C, similar to searing attachment 110 shown in FIG. 22B. In an exemplary embodiment, a distal portion of steam enclosure 212 is the first portion to rise when base frame 102 is lifted. In this way, escaping steam from within steam cavity 234 is vented at the distal end of steaming attachment 210, away from the operator positioned at the proximal end near handle 126. The forward-biased center of gravity also minimizes the application of shear forces on food items as base frame 102 is initially lifted or finally closed, preventing the movement of such food items longitudinally across the cooking surface when lift or lowering a cooking attachment.

Flanges 229 of steaming attachment 210 each include uprights 228, an upper portion of which form pivot arms 262, which are analogous in general structure and function to pivot arms 162 of uprights 128 described above with respect to searing attachment 110. However, rather than providing arcuate slots 166 centered upon the longitudinal axis of detent mechanism 172 to define the attachment pivot axis (as shown in FIG. 13 and described above), interaction between pivot arms 262 and the cylindrical mounting surface of pivot bolt 168 directly defines the attachment pivot axis. In particular, each pivot arm 262 defines a hook-shaped pivot slot 266 (FIG. 11) which can receive the cylindrical mounting surface of pivot bolt 168 along a lateral direction, then "hook on" to the cylindrical mounting surface under the weight of steaming attachment 210. Steaming attachment 210 can then pivot directly about the axis of pivot bolt 168.

Yet another cooking attachment which may be used in conjunction with base frame 102 is toasting attachment 310, shown in FIG. 11. Toasting attachment 310 may include a pair of side frame members 312 with uprights 328 attached thereto e.g., by welding. Flanges 329 may be respectively welded to uprights 328, with pivot arms 362 extending upwardly from flanges 329 in the same manner as described above with respect to pivot arms 262 of steaming attachment 210. At the proximal and distal ends of frame members 312, maille support frame members 313 may be fixed (e.g., by welding) to respective frame members 312. Maille support frame members 313 have a sheet of maille 334 attached thereto, which forms a pliable and weighted biasing force to gently press food items, such as buns, against cooking surface 132 when base frame 102 and toasting attachment 310 are in a closed position. Similar to attachments 110 and 210 described above, toasting attachment 310 may have a forwardly biased center of gravity such that maille 334 remains level or slightly tilted forwardly as handle 126 is raised from the closed position over the open position, thereby protecting the rear food items from becoming flattened or crushed. The forward-biased center of gravity also prevents moving food products longitudinally across cooking surface 134 when lifting or lowering the toasting attachment.

Further details of maille 334 and its application in the context of griddle 116 may be found in U.S. Patent Application Publication No. 2016/0029845, filed Apr. 23, 2015 and entitled COVER FOR FOOD ITEMS PLACED ON A COOKING SURFACE, the entire disclosure of which is hereby expressly incorporated herein by reference.

In addition to attachments 110, 210 and 310, other attachments may be employed in conjunction with base frame 102 as a part of modular cooking mechanism 100. For example, "active" type attachments engageable with base frame 102 may include heated upper platens, radiant platens, steam injected platens, and the like. Such attachments may be raised and lowered via base frame 102 in the same manner as described above with respect to the illustrated attachments 110, 210, 310. Other "passive" type attachments may include press attachments adapted for use with bacon and or quesadillas, chicken presses, and attachments for slicing and/or dicing food items contained upon cooking surface 132.

The modular attachability and detachability of varies cooking attachments, such as attachments 110, 210 and 310, allows griddle 116 to be readily and easily used for a wide variety of cooking tasks. Because base frame 102 need not be removed in order to switch from one attachment to another, the weight handled by an operator to facilitate a change in cooking function is minimized. Moreover, the physical space of the various attachments is also reduced by separation of base frame 102 from the attachments.

Although the attachments 110, 210, 310 described herein are configured to pivot through a defined range of motion, either by the use of detent mechanism 172 and arcuate slot 166 (FIG. 13) or through the use of hook-shaped pivot slot 266 (FIG. 11), it is contemplated that non-pivoting configurations may also be employed. In particular, both the slot-and-detent and hook-shaped slot arrangements can be spatially configured to prevent any pivoting of the attachment with respect to base frame 102, e.g., by designing an always-abutting fit between pivot arm 162 and cross frame 124, rather than only using such abutment to delimit rotation as shown in FIG. 22C. Further, the behavior of any respective attachment as it pivots may be controlled through strategic placement of center of gravity C (FIG. 22B) relative to quick release mechanism 160 as required or desired for particular application.

Figure 17:
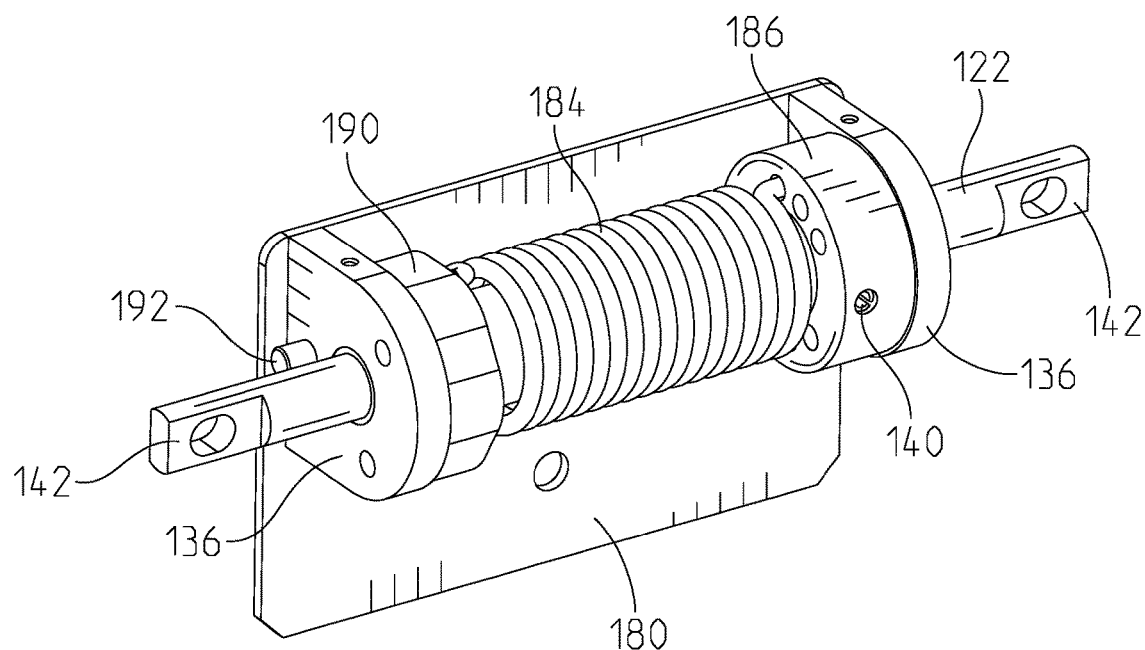
FIG. 17 is another perspective view of the yoke assembly of in FIG. 14, shown without the cover to illustrate internal components thereof.
Figure 18:
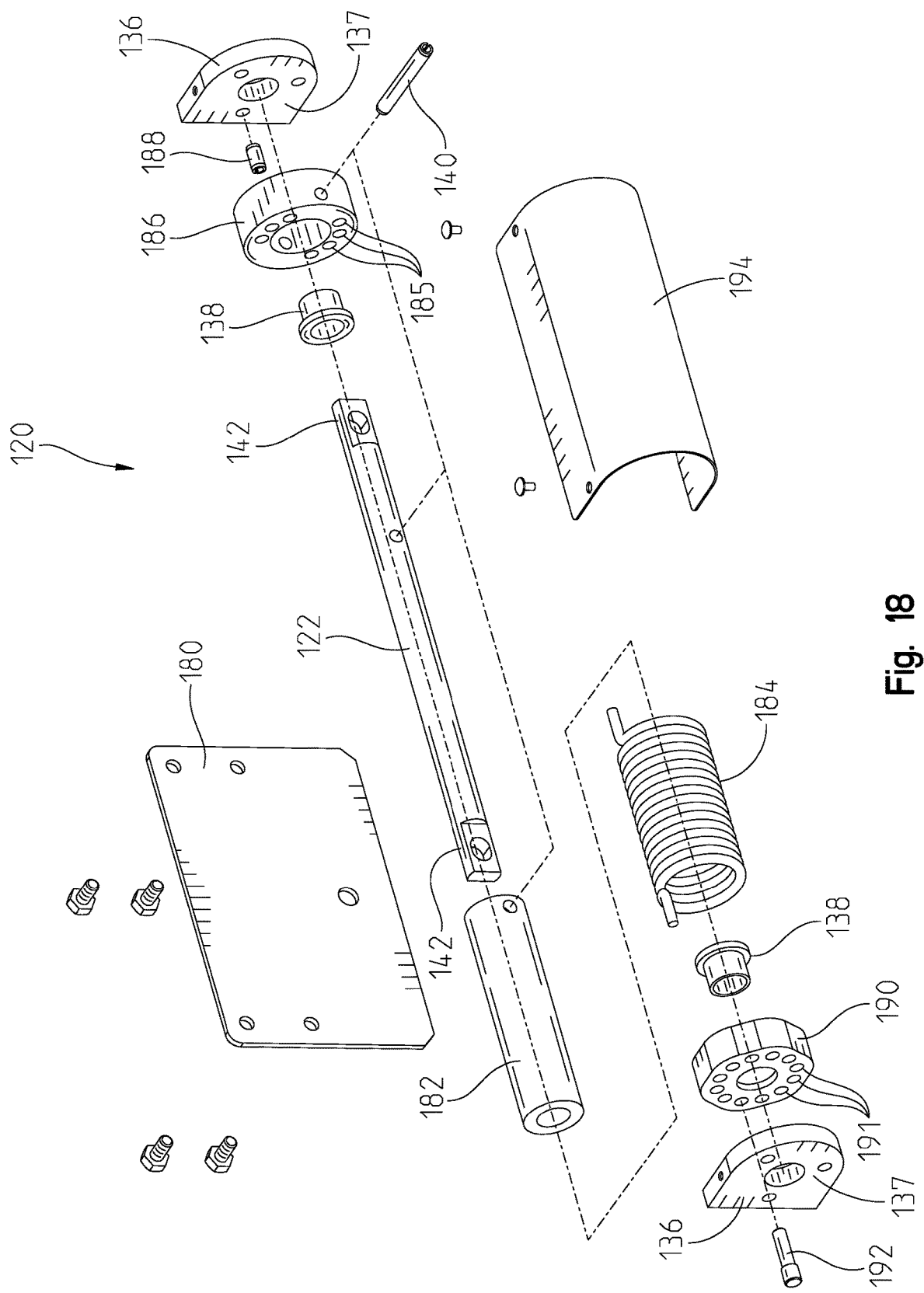
FIG. 18 is a perspective, exploded view of the yoke assembly of FIG. 14.

In an exemplary embodiment, base frame 102 is counterbalanced by yoke assembly 120 such that minimal force applied to handle 126 is sufficient to raise base frame 102 and any associated attachment from the closed position toward the open position. For example, an upward force application of as little as 1 lb, 4 lbs or 7 lbs upon handle 126 may be sufficient to raise base frame 102 and searing attachment 110 from the closed position shown in FIG. 22A toward the open position shown in FIG. 22C. This counterbalance is effected by torsion spring 184 and associated transmission components, as shown in FIGS. 17 and 18. As described in further detail below, a first free end of torsion spring 184 is operably coupled to a stationary yoke frame formed by base plate 180 and a pair of arms 136 extending therefrom, while the other free end of torsion spring 184 is operably coupled to pivot shaft 122 such that it can impart a lifting torque to U-shaped frame 114 and thereby reduce the required amount of force required to lift base frame 102 and any associated attachment.

Referring to the exploded view of yoke assembly 120 shown in FIG. 18, pivot shaft 122 may be rotatably fixed with a spring support sleeve 182 and a tension preload collar 186 via a pin 140 as illustrated. In an exemplary embodiment, spring support sleeve 182 is made of polyoxymethylene, such as Delrin available from DuPont USA. The other components of yoke assembly 120 may be made of stainless steel except as otherwise specifically noted herein.

Torsion spring 184 may be received over spring support sleeve 182, and a free end of spring 184 may then be received in a chosen one of the plurality of apertures formed in the adjacent annular surface of tension preload collar 186. The choice of aperture 185 can be based upon a desired preload for torsion spring 184. For example, choosing an aperture near the free end of spring 184 when base frame 102 is in an the open position will allow stored energy via torsion within spring 184 as the base frame 102 is lowered into its closed position.

Figure 19:
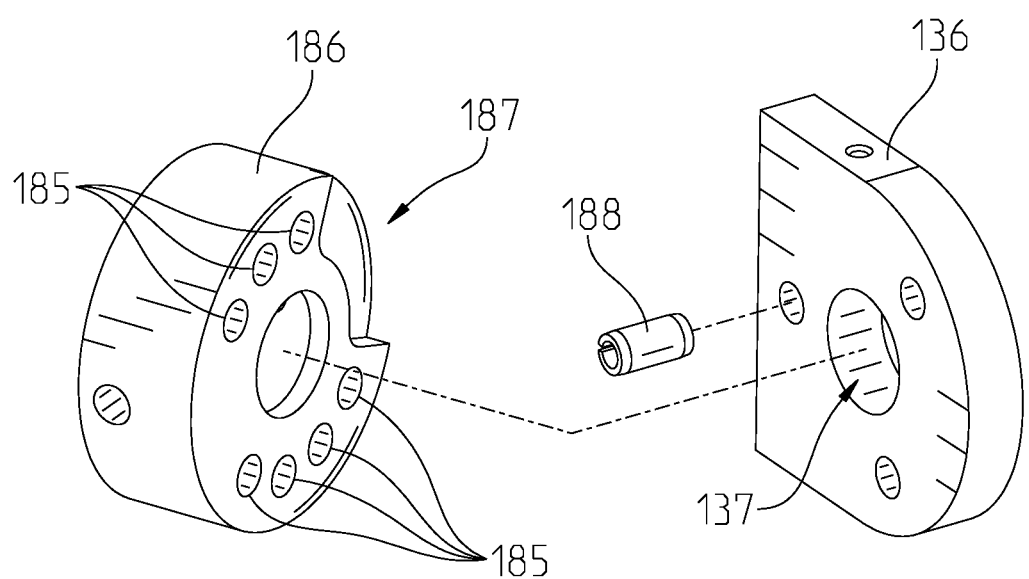
FIG. 19 is a perspective, exploded view of a portion of the yoke assembly of FIG. 14, illustrating the engagement between an arm and a tension preload collar.
Figure 20:
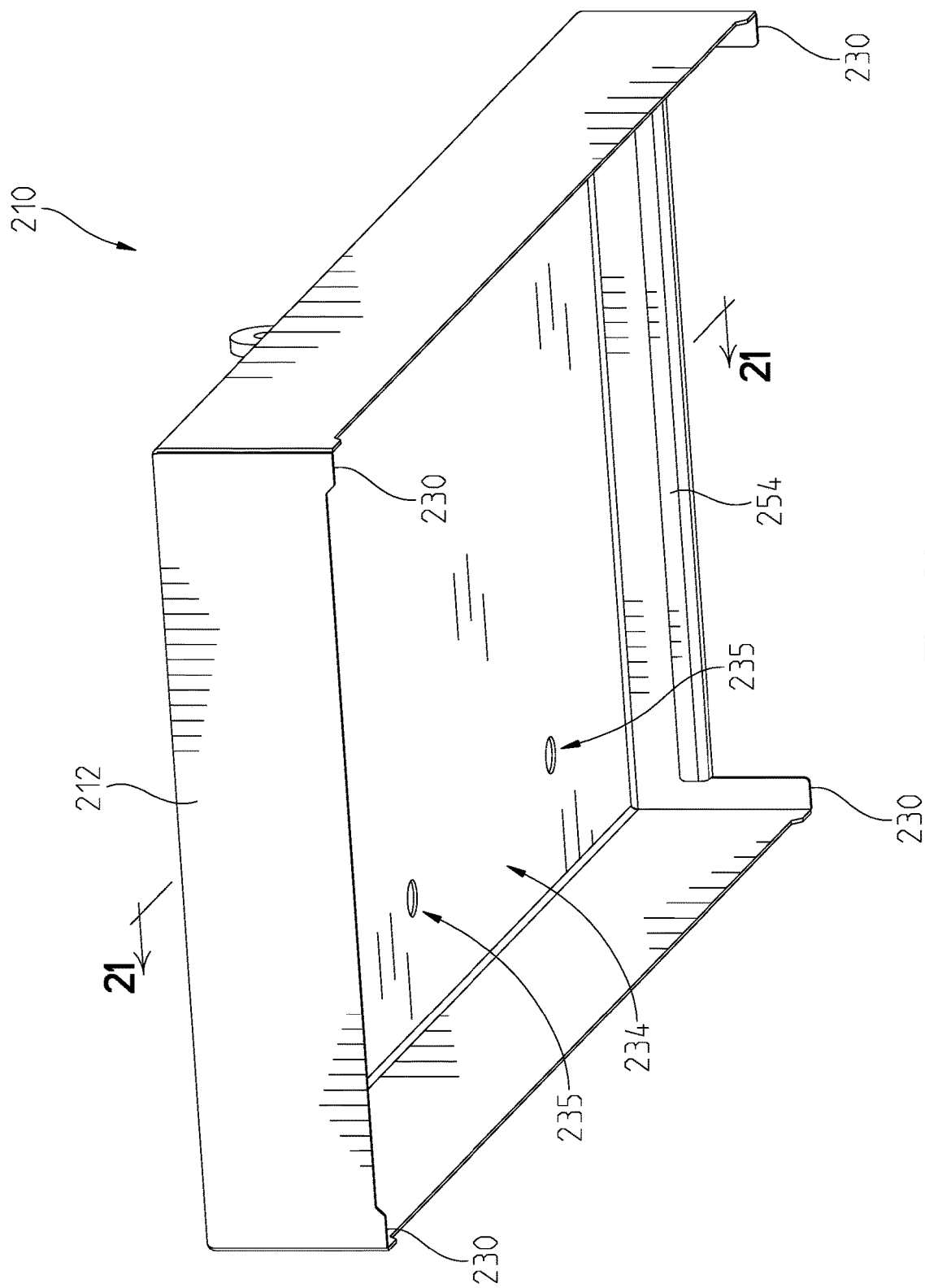
FIG. 20 is a perspective view showing the underside of a steaming attachment of the present disclosure.

Turning to FIG. 19, pin 188 may be fixed to any of the illustrated apertures in arm 136 to form a fixed protrusion extending therefrom. Pin 188 is received within an arcuate void 187 formed on the outside annular surface of preload collar 186. As collar rotates together with shaft 122 and sleeve 182 during opening or closing of base frame 102, pin traverses arcuate void 187. If it is attempted to move base frame 102 beyond the intended range of motion defined by arcuate void 187, pin 188 abuts the end of void 187 and prevents such movement. For this reason, collar 186 has a narrow range of rotational orientations permissible for a given position of base frame 102, and therefore the tension adjustment afforded by apertures 185 is also narrow.

To provide additional tension adjustment, the opposing free end of spring 184 is received within one of the plurality of adjustment apertures 191 formed in the inside and outside annular surfaces of tension adjustment collar 190. Similar to collar 186, any convenient aperture 191 may be utilized depending on the initial orientation of spring 184. However, while collar 186 is constrained to a fixed range of motion by interaction with pin 188 and arm 136, tension adjustment collar 190 is free to rotate about shaft 122 and with respect to the adjacent arm 136 unless and until collar bolt 192 is passed through arm 136 and engaged with one of the outside apertures 191 to lock tension adjustment collar 190 at the desired rotational position, as shown in FIG. 17. In addition, tension adjustment collar 190 is formed as a generally hexagonal construct, such that opposing flats may be engaged by a wrench in order to forcibly rotate tension adjustment collar 190 against the torsional spring bias of spring 184.

In this way, tension adjustment collar 190 may be rotated about the pivot axis of shaft 122 to preload or "clock" spring 184 to provide as much tension as desired for a given position of base frame 102. Thus, tension adjustment collar 190 may be used to tune the amount of assistance provided by torsion spring 184 to the lifting of base frame 102 and any associated attachment. Further, as shown in FIG. 17, tension adjustment collar 190 and the associated collar bolt 192 are accessible to an operator of modular cooking mechanism 100 (FIG. 11) and griddle 116 (FIG. 10), such that field adjustments of the torsion preload within spring 184 may be made as necessary, e.g., when changing from a relatively light attachment to a heavier attachment or vice versa. Cover 194 is provided to cover the components of yoke assembly 120 and protect such components from contamination by, e.g., grease or dust. Cover 194 may be readily removed to expose tension adjustment collar 190 and the other components for adjustment or service as needed.

Bushings 138 may be provided to provide a lubricious interface between pivot shaft 122 and the respective pair of arms 136 through which it passes. The apertures formed in each arm 136 are coaxial and define an axis substantially parallel to a plane defined by base plate 180 as well as to a plane defined by cooking surface 132. Shaft 122 is, of course, coaxial with these apertures such that the pivot axis of base frame 102 is similarly parallel to base plate 180 and cooking surface 132. As described above with respect to searing mechanism 10, U-shaped frame 114 is attached to shaft 122 via extensions 142.

Figure 15:
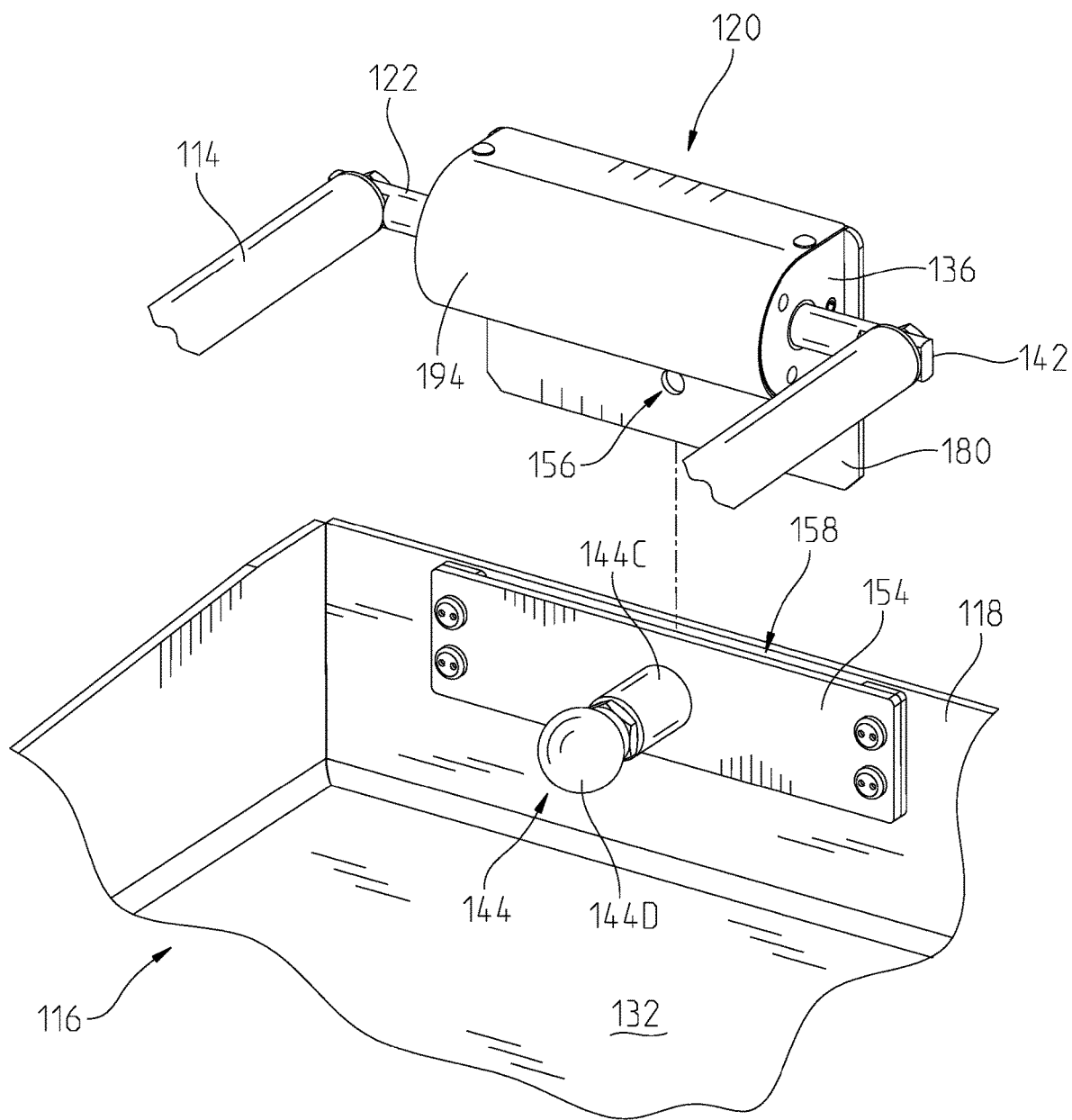
FIG. 15 is a perspective view of the yoke assembly of in FIG. 14, illustrating its attachment to the griddle of FIG. 10.
Figure 16:
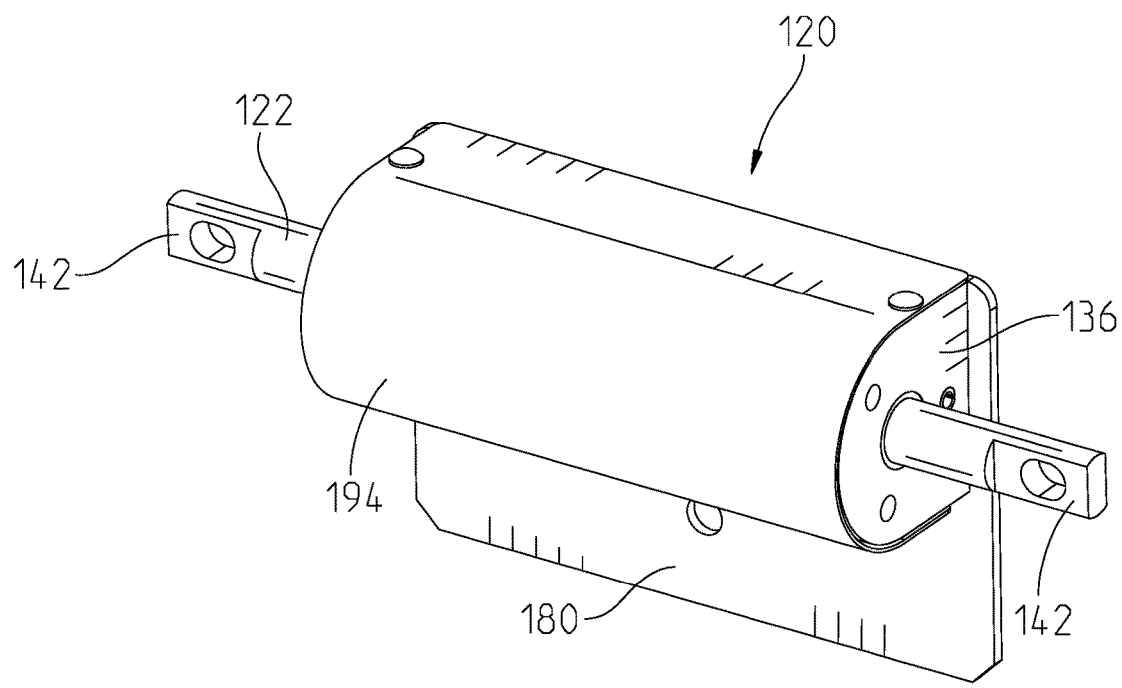
FIG. 16 is a perspective view of the yoke assembly of in FIG. 14.

In addition the modular attachment of various cooking attachments to base frame 102, the frame 102 itself may also be modularly attached to, or disconnected from, griddle 116. Turning to FIG. 15, a lower portion of base plate 180 of yoke assembly 120 is sized to be received within a slot 158 formed between mechanism attachment plate 154 and the adjacent rear splash shield 118 of griddle 116. For some applications in which a downward pressure on handle 126 is not expected, such as steaming attachment 210 shown in FIG. 10, no further fixation is necessary other than the passage of base plate 180 into slot 158. In such an installation, the weight of the attachment is sufficient to hold base plate 180 in slot 158 during normal use.

Figure 14:
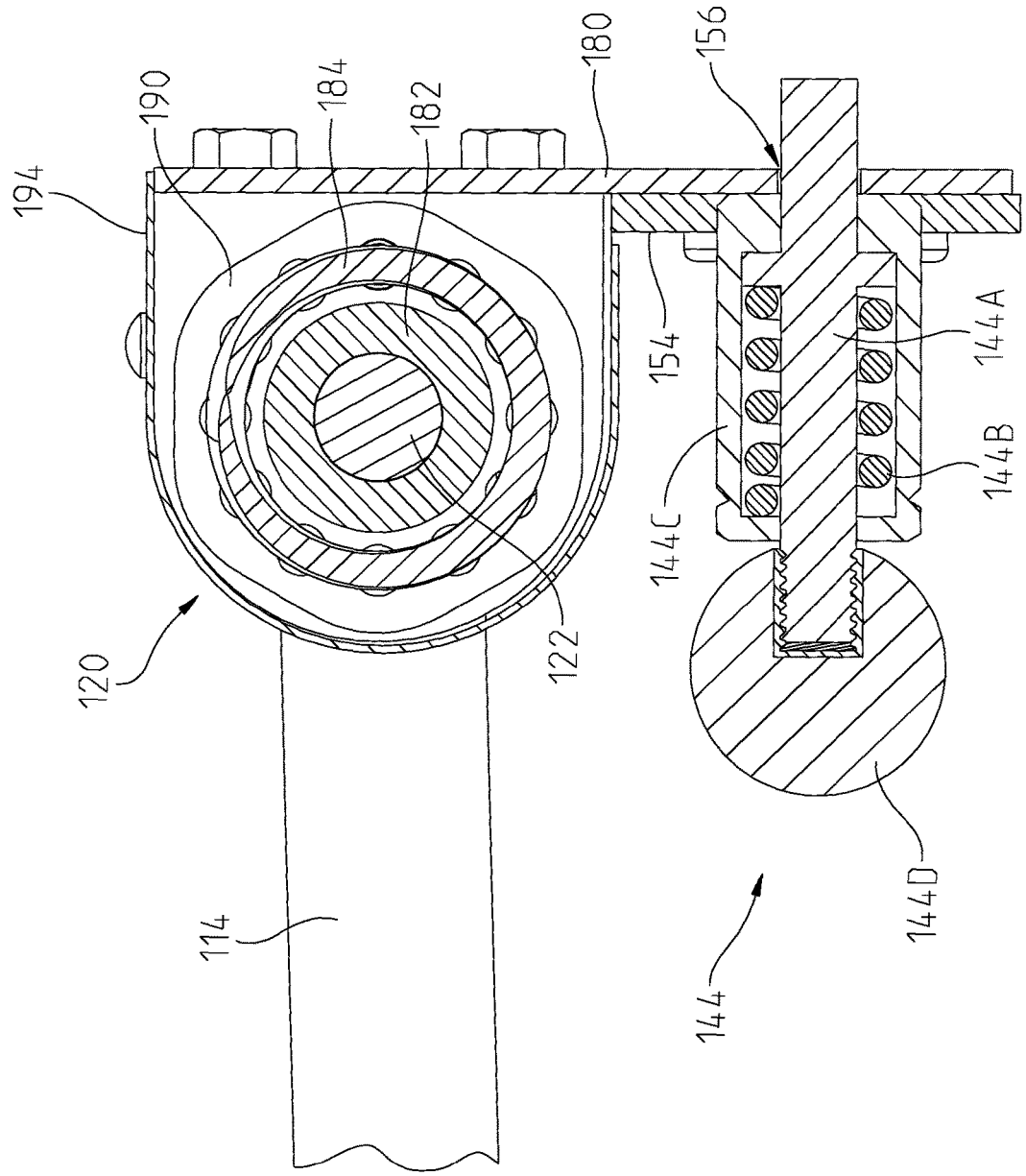
FIG. 14 is a side elevation, cross-section view of a yoke assembly of the present disclosure.

In other applications, such as searing attachment 110, a downward force may be occasionally applied to handle 126 resulting in a corresponding upward force urging base plate 180 out of engagement with slot 158. For such applications a quick release assembly 144 may also be provided in order to lock yoke assembly 120 into slot 158. As best shown in FIG. 14, quick release assembly 144 includes housing 144C which is fixed to the lower portion of base plate 154. Plunger 144A is received within housing 144C and biased into an engaged position by spring 144B, which urges the distal end of plunger 144A through an aperture in plate 180 as illustrated. A handle 144D may be provided to retract plunger 144A into housing 144C by manual operation. Turning to FIG. 15, handle 144D may be pulled against the biasing force of spring 144B (FIG. 14) to retract plunger 144A, at which time base plate 180 may be received into slot 158.

When plunger 144A becomes aligned with aperture 156, and handle 144D may be released to allow spring 144B (FIG. 14) to bias plunger 144A through aperture 156, thereby locking base plate 180 into slot 158.

Any of the alternative features mentioned in this document can be combined to arrive at further alternative embodiments of the disclosure.

Searing mechanisms 10 and 110, and steaming and toasting attachments 210 and 310, are generally constructed of stainless steel components, unless otherwise noted herein.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A modular cooking mechanism, comprising:
  a frame having a proximal portion with a handle configured for operator manipulation, and a distal portion opposite the proximal portion;
  a yoke assembly comprising:
  a yoke frame having a base plate and a pair of arms extending away from the base plate, the pair of arms each having an aperture formed therethrough which defines an axis substantially parallel to a plane defined by the base plate;
  a pivot shaft fixed to the distal portion of the frame and coupled to the apertures formed in the pair of arms, such that the pivot shaft defines a pivot axis of the frame;
  a counterbalance spring coiled around the pivot shaft and having a first end attached to the yoke frame, and a second end attached to the pivot shaft, whereby rotation of the frame about the pivot axis is biased by the counterbalance spring; and
  a modular attachment feature fixed to the frame between the proximal portion and the distal portion, the modular attachment feature comprising:
    a cylindrical mounting surface defining an attachment pivot axis substantially parallel to the pivot axis of the frame;
    a retention shoulder adjacent the cylindrical mounting surface, the retention shoulder configured to provide lateral restraint to movement of a structure disposed on the cylindrical mounting surface; and
    a cooking attachment pivotably mounted to the frame via the modular attachment feature, the cooking attachment having an upper cooking surface.

2. The modular cooking mechanism of claim 1, further comprising:
  a griddle having a lower cooking surface, the yoke assembly removably attachable to the griddle via the yoke frame to hingedly connect the base frame to the griddle, the frame rotatable between a closed position in which the upper cooking surface of the cooking attachment is substantially parallel to the lower cooking surface of the griddle, and an open position in which the upper cooking surface is pivoted away from the lower cooking surface,
  the counterbalance spring configured to aid in raising the frame from the closed position to the open position.

3. The modular cooking mechanism of claim 2, wherein the cooking attachment is a searing attachment in which the upper cooking surface is a searing surface, the searing attachment comprising:
  a searing plate defining the searing surface;
  an upright fixed to the searing plate and having an arcuate slot sized to receive the cylindrical mounting surface of the modular attachment feature, such that the searing attachment is rotatably mounted to the base frame as the cylindrical mounting surface traverses the arcuate slot.

4. The modular cooking mechanism of claim 3, further comprising a detent mechanism comprising:
  a spring-biased detent pin fixed to the upright;
  a detent aperture formed in the modular attachment feature of the frame, the detent aperture sized and positioned to receive the detent pin when the searing attachment is pivotably mounted to the frame, the detent pin, the detent aperture and the arcuate slot cooperating to define the attachment pivot axis.

5. The modular cooking mechanism of claim 4, further comprising:
  a plurality of feet extending from the searing plate and spaced about a perimeter of the searing plate, the plurality of feet defining a searing spacing when the frame is in the closed position.

6. The modular cooking mechanism of claim 1, further comprising a tension adjustment collar functionally interposed between the counterbalance spring of the yoke assembly and the yoke frame,
  the counterbalance spring having a first free end received a spring-receiving aperture formed in a first annular surface of the tension adjustment collar,
  the tension adjustment collar rotatable about the pivot axis to rotate the free end relative to the remainder of the counterbalance spring, to thereby increase or decrease a pre-load of the counterbalance spring, and
  the tension adjustment collar having at least one adjuster aperture formed in a second annular surface of the tension adjustment collar opposite the first annular surface, the adjuster aperture engaged by a collar bolt to rotatably lock the tension adjustment collar to one of the pair of arms of the yoke frame at a desired rotational position.

7. The modular cooking mechanism of claim 6, further comprising a tension preload collar functionally interposed between the counterbalance spring of the yoke assembly and the yoke frame,
  the counterbalance spring having a second free end opposite the first free end and received in one of a plurality of spring mount apertures formed around a first annular surface of the tension preload collar, such that a preload of the counterbalance spring is controllable by a choice among the plurality of spring mount apertures,
  the tension preload collar having an arcuate void formed in a second annular surface of the tension preload collar opposite the first annular surface thereof, the yoke frame including a protrusion fixed to the adjacent arm and protruding into the arcuate void, such that the tension preload collar is rotatable about the pivot axis within a fixed range of motion defined by an angular extent of the arcuate void.

8. The modular cooking mechanism of claim 7, further comprising a spring support sleeve radially interposed between the pivot shaft and the counterbalance spring and axially interposed between the pair of arms, the spring support sleeve being made of polyoxymethylene and the pair of arms being formed from stainless steel.

9. The modular cooking mechanism of claim 8, wherein the pivot shaft, the spring support sleeve and the tension preload collar are all rotatably fixed to one another.

10. A griddle comprising:
a cooking surface;
a base frame rotatable between a closed position and an open position, the base frame having a first attachment feature;
a first cooking attachment having a second attachment feature complementary to the first attachment feature, the first attachment feature configured to be engaged with the second attachment feature to rotatably attach the first cooking attachment to the base frame by hand and without the use of tools;
a second cooking attachment having a third attachment feature complementary to the first attachment feature, the first attachment feature configured to be engaged with the third attachment feature to rotatably attach the second cooking attachment to the base frame by hand and without the use of tools,
whereby the first and second cooking attachments are modularly attachable to the griddle via the base frame, and
a yoke assembly comprising:
a yoke frame having a base plate and a pair of arms extending away from the base plate, the pair of arms each having an aperture formed therethrough which defines an axis substantially parallel to a plane defined by the base plate; and
a pivot shaft fixed to the distal portion of the base frame and coupled to the apertures formed in the pair of arms, such that the pivot shaft defines a pivot axis of the base frame.

11. The griddle of claim 10, wherein:
the base frame rotates about a base frame pivot axis substantially parallel to the cooking surface;
the first attachment feature comprises a cylindrical mounting surface defining an attachment pivot axis substantially parallel to the base frame pivot axis; and
the second attachment feature comprises an arcuate slot sized to receive the cylindrical mounting surface, such that the first cooking attachment is rotatable relative to the base frame as the cylindrical mounting surface traverses the arcuate slot.

12. The griddle of claim 11, wherein the first cooking attachment comprises a searing attachment.

13. The griddle of claim 12, wherein:
the third attachment feature comprises a hook-shaped slot sized to receive the cylindrical mounting surface, such that the second cooking attachment is rotatable relative to the base frame as the cylindrical mounting surface rotates within the hook-shaped slot.

14. The griddle of claim 13, wherein the second cooking attachment comprises a steaming attachment having a steam enclosure.

15. The griddle of claim 14, wherein the steam enclosure comprises:
at least one steam vent formed therein; and
a drip catch channel formed at a back surface of the steam enclosure.

16. The griddle of claim 13, wherein the second cooking attachment comprises a toasting attachment having a maille sheet selectively engageable with the cooking surface.

17. The griddle of claim 10, wherein the griddle further comprises a mounting plate mounted near the cooking surface, and the base frame further comprises:
a quick release assembly attached to the mounting plate of the griddle, the quick release assembly having a plunger biased into engagement with a correspondingly sized aperture formed in base plate of the yoke frame to vertically fix the yoke assembly to the griddle.

18. The griddle of claim 17, wherein the mounting plate of the griddle defines a slot between the mounting plate and an adjacent griddle surface, the base plate of the yoke frame sized to be received downwardly into the slot.

* * * * *